United States Patent
Liu et al.

(10) Patent No.: US 12,200,647 B2
(45) Date of Patent: Jan. 14, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Zheng Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 408 days.

(21) Appl. No.: 17/690,003

(22) Filed: Mar. 9, 2022

(65) Prior Publication Data

US 2022/0201637 A1 Jun. 23, 2022

Related U.S. Application Data

(63) Continuation of application No. PCT/CN2020/112789, filed on Sep. 1, 2020.

(30) Foreign Application Priority Data

Sep. 12, 2019 (CN) .......................... 201910866952.4

(51) Int. Cl.
*H04W 56/00* (2009.01)
*H04L 27/26* (2006.01)
(Continued)

(52) U.S. Cl.
CPC ... *H04W 56/0045* (2013.01); *H04L 27/26025* (2021.01); *H04W 72/0446* (2013.01); *H04W 72/0453* (2013.01); *H04W 72/20* (2023.01)

(58) Field of Classification Search
CPC ......... H04W 56/0045; H04W 72/0446; H04W 72/0453; H04W 72/20; H04L 27/26025;
(Continued)

(56) References Cited

U.S. PATENT DOCUMENTS 11,382,086 B2* 7/2022 Wang .................... H04L 5/0053
2017/0245165 A1 8/2017 Onggosanusi
(Continued)

FOREIGN PATENT DOCUMENTS

CN 107852302 A 3/2018
CN 110167186 A 8/2019
(Continued)

OTHER PUBLICATIONS

CN201910866952.4 Notification to Grant Patent Right for Invention dated Apr. 28, 2022.
(Continued)

*Primary Examiner* — Kwang B Yao
*Assistant Examiner* — Syed M Bokhari

(57) ABSTRACT

The present disclosure provides a method and device in nodes used for wireless communication. The node receives a first signaling; transmits a first signal in a first time-frequency resource set; and transmits a second signal in a second time-frequency resource set; the first signaling is used to determine the first time-frequency resource set, and the first signaling is used to determine a reference time-frequency resource set; a first TA quantity is used to determine a TA quantity of an uplink timing relative to a downlink timing; a length of a time interval between a start time of the second time-frequency resource set in time domain and a start time of the reference time-frequency resource set in time domain is equal to a first time length, the first time length is equal to one of X candidate time lengths. The application ensures the correct reception of the feedback.

17 Claims, 7 Drawing Sheets

(51) Int. Cl.
*H04W 72/0446* (2023.01)
*H04W 72/0453* (2023.01)
*H04W 72/20* (2023.01)

(58) Field of Classification Search
CPC ..... H04L 1/16; H04L 1/18; H04L 5/00; H04L 1/1607; H04L 1/1812; H04L 5/0053
USPC ........................................................ 370/503
See application file for complete search history.

(56) References Cited

U.S. PATENT DOCUMENTS

| | | | |
|---|---|---|---|
| 2018/0324861 A1* | 11/2018 | Oh | H04W 48/08 |
| 2018/0376384 A1 | 12/2018 | Youn | |
| 2019/0124636 A1* | 4/2019 | Jiang | H04W 72/044 |
| 2019/0373592 A1* | 12/2019 | Ji | H04B 7/063 |
| 2020/0244418 A1* | 7/2020 | Baldemair | H04L 5/0042 |

FOREIGN PATENT DOCUMENTS

| | | |
|---|---|---|
| WO | 2018133081 A1 | 7/2018 |
| WO | 2018204130 A1 | 11/2018 |
| WO | 2018236197 A1 | 12/2018 |

OTHER PUBLICATIONS

CN201910866952.4 First Search Report dated Apr. 20, 2022.
ISR received in application No. PCT/CN2020/112789 dated Nov. 27, 2020.
Huaw'ei et al. "Sidelink physicallayer structure for NR V2X" 3GPP TSG RAN WGI Meeting #97 RI-1906007, May 17, 2019 (May 17, 2019).
"R1-162481 Discussion on eNB scheduling enhancement for sidelink resource allocation_LG" 3GPP TSG RAN WG1_RL1 Apr. 2, 2016.

* cited by examiner

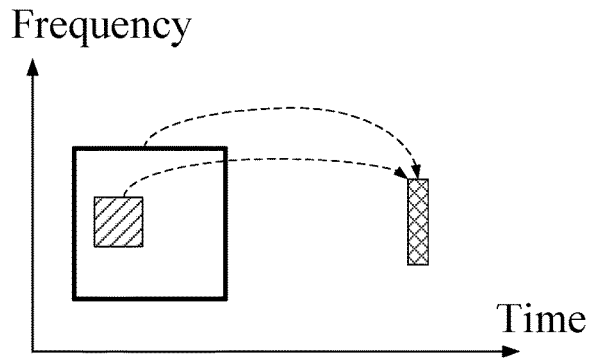

FIG. 9

| Time interval between first signaling and first signal $T_{DL-SL}$ | SCS of first time-frequency resource set | SCS of second time-frequency resource set | X candidate time lengths (unit for measurement: uplink slot) |
|---|---|---|---|
| $T_{DL-SL} - \Delta \leq 1$ uplink slot | 15kHz | 15kHz | {0,1} |
| $T_{DL-SL} - \Delta < 1$ uplink slot | 15kHz | 30kHz | {0,2} |
| $T_{DL-SL} - \Delta \geq 1$ uplink slot | 15kHz | 30kHz | {0,1} |
| $T_{DL-SL} - \Delta < 1$ uplink slot | 15kHz | 60kHz | {0,4} |
| 1 uplink slot $\leq T_{DL-SL} - \Delta < 2$ uplink slots | 15kHz | 60kHz | {0,3} |
| 2 uplink slots $\leq T_{DL-SL} - \Delta < 3$ uplink slots | 15kHz | 60kHz | {0,2} |
| $T_{DL-SL} - \Delta \geq 3$ uplink slots | 15kHz | 60kHz | {0,1} |
| $T_{DL-SL} - \Delta \leq 1/2$ uplink slot | 30kHz | 15kHz | {0,1} |
| $T_{DL-SL} - \Delta \leq 1$ uplink slot | 30kHz | 30kHz | {0,1} |
| $T_{DL-SL} - \Delta < 1$ uplink slot | 30kHz | 60kHz | {0,2} |
| $T_{DL-SL} - \Delta \geq 1$ uplink slot | 30kHz | 60kHz | {0,1} |

FIG.10

| Difference value between third time length and second time length | First time length (unit for measurement: uplink slot) |
|---|---|
| Being less than first TA quantity | 0 |
| Being greater than or equal to first TA quantity | $\left\lceil \frac{SCS_{UL}}{SCS_{SL}} \right\rceil \cdot \left\lfloor \frac{T\_delay}{T\_slot\_UL} \right\rfloor$ |

FIG. 11

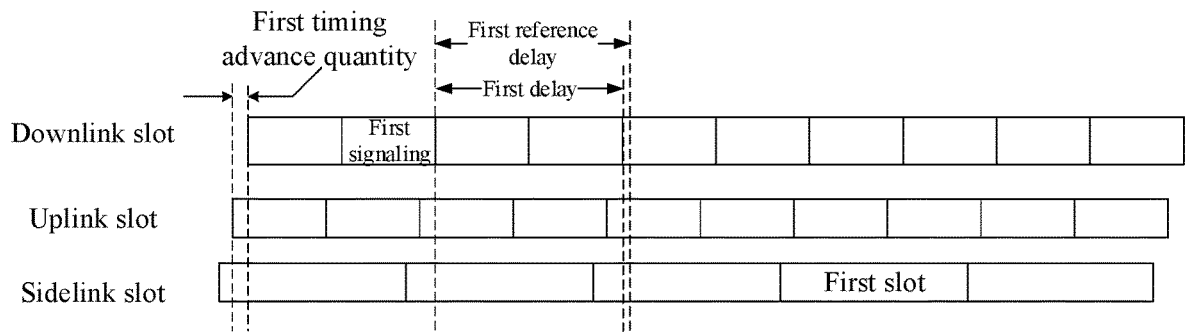
FIG. 12
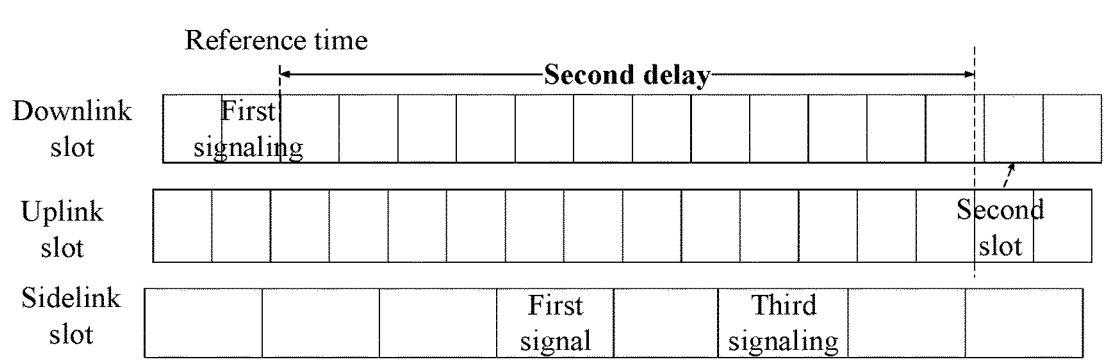
Case A
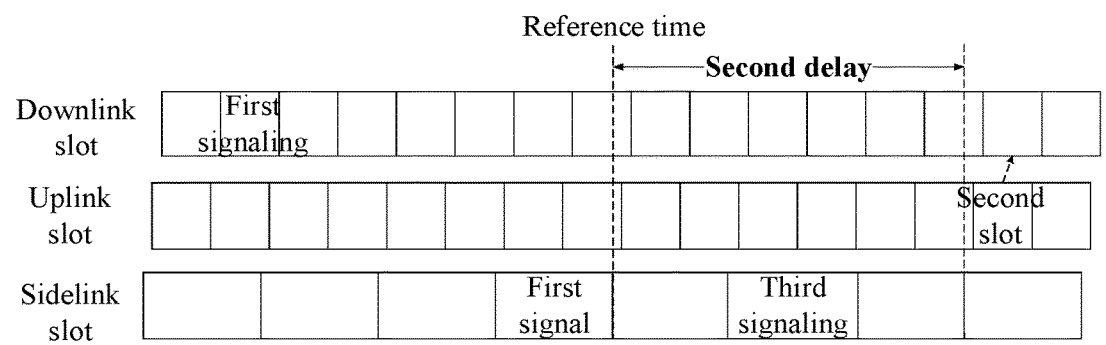
Case B
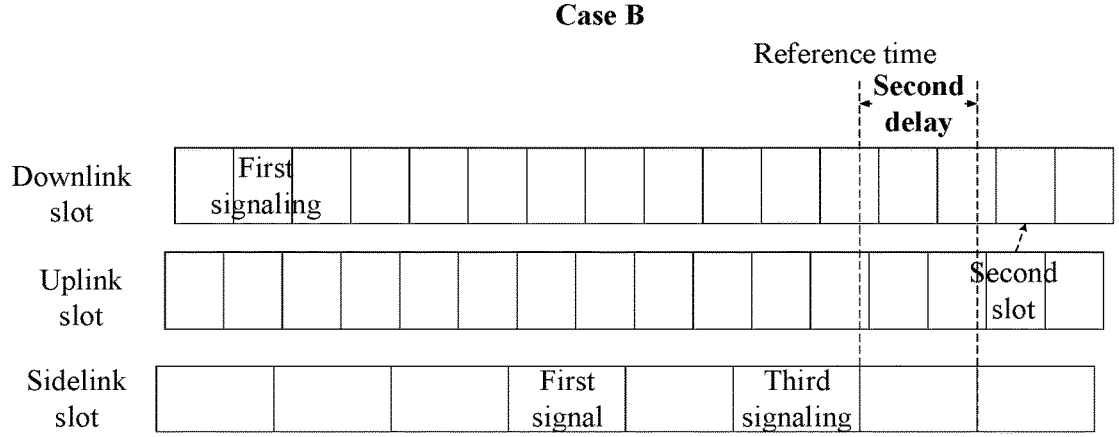
Case C
FIG. 13

METHOD AND DEVICE IN NODES USED FOR WIRELESS COMMUNICATION

CROSS REFERENCE TO RELATED APPLICATIONS

This application is the continuation of International Patent Application No. PCT/CN2020/112789, filed on Sep. 1, 2020, which claims the priority benefit of Chinese Patent Application No. 201910866952.4, filed on Sep. 12, 2019, the full disclosure of which is incorporated herein by reference.

BACKGROUND

Technical Field

The present disclosure relates to transmission methods and devices in wireless communication systems, and in particular to a transmission scheme and device of feedback information in wireless communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. The technical Study Item (SI) of NR V2X was approved at 3GPP RAN #80 Plenary, and the WI was decided to start for NR V2X at 3GPP RAN #83 Plenary.

SUMMARY

Compared with the existing LTE V2X system, NR V2X has a notable feature in supporting Groupcast and Unicast as well as supporting Hybrid Automatic Repeat Request (HARQ) function. At 3GPP RANI #95 meeting, an independent feedback channel (PSFCH) is agreed to be introduced. The Physical Sidelink Feedback Channel (PSFCH) is used to carry a HARQ. In addition, 3GPP agrees that a User Equipment (UE) can report a HARQ feedback of sidelink to a base station. The UE reports to the base station that the HARQ feedback design of the sidelink needs a solution.

In view of the problem in the design of the HARQ feedback report of the sidelink, the present disclosure discloses a solution. It should be noted that the embodiments of a first node in the present disclosure and the characteristics of the embodiments may be applied to a second node if no conflict is incurred, and vice versa. And the embodiments in the present disclosure and the characteristics in the embodiments can be arbitrarily combined if there is no conflict.

The present disclosure provides a method in a first node for wireless communications, comprising:
receiving a first signaling;
transmitting a first signal in a first time-frequency resource set; and
transmitting a second signal in a second time-frequency resource set;
herein, the first signaling is used to determine the first time-frequency resource set, and the first signaling is used to determine a reference time-frequency resource set; a first Timing Advance (TA) quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

In one embodiment, a transmission slot occupied by the second signal is adjusted according to the first TA quantity, which avoids the timing ambiguity between a UE and a base station on sidelink HARQ report incurred by a timing offset between sidelink as well as uplink and downlink, so as to ensure the correct reception of the sidelink HARQ report.

In one embodiment, the UE adjusts a transmission slot occupied by the second signal by itself according to the first TA quantity, and the UE determines a time for transmitting the sidelink HARQ report according to an implicit relation, so as to avoids introducing an explicit signaling to solve the timing ambiguity problem of the sidelink HARQ report, thus reducing header overhead.

According to one aspect of the present disclosure, the above method is characterized in also comprising:
transmitting a second signaling; and
receiving a third signaling;
herein, the second signaling is used to indicate at least one of time-frequency resources occupied by the first signal, or a Modulation and Coding Scheme (MCS) adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling.

According to one aspect of the present disclosure, the above method is characterized in that a time length of a time interval between an end time for receiving the first signaling and a start time for transmitting the first signal, a Subcarrier Spacing (SCS) of a subcarrier comprised in the first time-frequency resource set in frequency domain and an SCS of a subcarrier comprised in the second time-frequency resource set in frequency domain are used together to determine the X candidate time lengths.

In one embodiment, the difference of numerologies or SCSs between uplink transmission and sidelink as well as the difference of timing of sidelink and uplink are considered when the X candidate time lengths are determined, so as to implement the TA quantity of the sidelink HARQ report in an implicit way, solving the problem of the timing ambiguity of the sidelink HARQ report incurred by different numerologies or SCSs.

According to one aspect of the present disclosure, the above method is characterized in that a time length of a time interval between an end time for receiving the first signaling and a start time of the first time-frequency resource set in time domain is used to determine a second time length, a time length of a slot among slot(s) to which time-domain resources comprised in the first time-frequency resource set belong is equal to a third time length, a magnitude relation between a difference value of the third time length and the second time length and the first TA quantity is used to determine the first time length out of the X candidate time lengths.

According to one aspect of the present disclosure, the above method is characterized in also comprising:

receiving first information;

herein, the first information is used to determine the first TA quantity, and the first information is transmitted via an air interface.

According to one aspect of the present disclosure, the above method is characterized in that the first signaling is used to determine a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

According to one aspect of the present disclosure, the above method is characterized in that the first signaling is used to determine a second delay, a start time of the reference time-frequency resource set in time domain is equal to a start time of a second slot, and a start time of the second time slot is not earlier than a reference time; for an SCS of a subcarrier comprised in the second time-frequency resource set in frequency domain, the second slot is an earliest slot satisfying a length of a time interval between its start time and the reference time is not less than the second delay; the reference time is one of an end time for receiving the first signaling, an end time for transmitting the first signal or an end time for receiving the third signaling.

In one embodiment, by defining a delay (that is, the second delay) of the second time-frequency resource set in time domain and the reference time, the overhead of a signaling indicating the timing of the sidelink HARQ report is reduced.

The present disclosure provides a method in a second node for wireless communications, comprising:

transmitting a first signaling; and receiving a second signal in a second time-frequency resource set;

herein, the first signaling is used to indicate the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1.

According to one aspect of the present disclosure, the above method is characterized in that an SCS of a subcarrier comprised in the first time-frequency resource set in frequency domain and an SCS of a subcarrier comprised in the second time-frequency resource set in frequency domain are used together to determine the X candidate time lengths.

According to one aspect of the present disclosure, the above method is characterized in also comprising:

transmitting first information;

herein, the first information is used to determine the first TA quantity, and the first information is transmitted via an air interface.

According to one aspect of the present disclosure, the above method is characterized in that the first signaling is used to indicate a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

The present disclosure provides a first node for wireless communication, comprising:

a first receiver, receiving a first signaling;

a first transmitter, transmitting a first signal in a first time-frequency resource set; and a second transmitter, transmitting a second signal in a second time-frequency resource set;

herein, the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

The present disclosure provides a second node for wireless communications, comprising:

a third transmitter, transmitting a first signaling; and a second receiver, receiving a second radio signal in a second time-frequency resource set;

herein, the first signaling is used to determine the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1.

In one embodiment, the method in the present disclosure is advantageous in the following aspects:

by adopting the method in the present disclosure, the timing ambiguity between a UE and a base station on the sidelink HARQ report incurred by a timing offset between sidelink as well as uplink and downlink is avoided, so as to ensure the correct reception of the sidelink HARQ report.

by adopting the method in the present disclosure, the UE adjusts a transmission slot of the sidelink HARQ report according to a TA, which avoids introducing an explicit signaling to solve the problem of timing ambiguity of the sidelink HARQ report, thus reducing the header overhead.

by adopting the method in the present disclosure, the TA quantity of the sidelink HARQ report is realized in an implicit way, which solves the problem of the timing ambiguity of the sidelink HARQ report incurred by different numerologies or SCSs.

by adopting the method in the present disclosure, by defining a relative delay between the sidelink HARQ report and a PSSCH or a PSFCH, the overhead of a signaling indicating the timing of the sidelink HARQ report is reduced.

BRIEF DESCRIPTION OF THE DRAWINGS

Other features, objects and advantages of the present disclosure will become more apparent from the detailed description of non-restrictive embodiments taken in conjunction with the following drawings:

FIG. 9 illustrates a schematic diagram of relations among a first signal, a second signaling and a third signaling according to one embodiment of the present disclosure;

FIG. 10 illustrates a schematic diagram of X candidate time lengths according to one embodiment of the present disclosure;

FIG. 11 illustrates a schematic diagram of a first time length according to one embodiment of the present disclosure;

FIG. 12 illustrates a schematic diagram of a first slot according to one embodiment of the present disclosure;

FIG. 13 illustrates a schematic diagram of a second slot according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
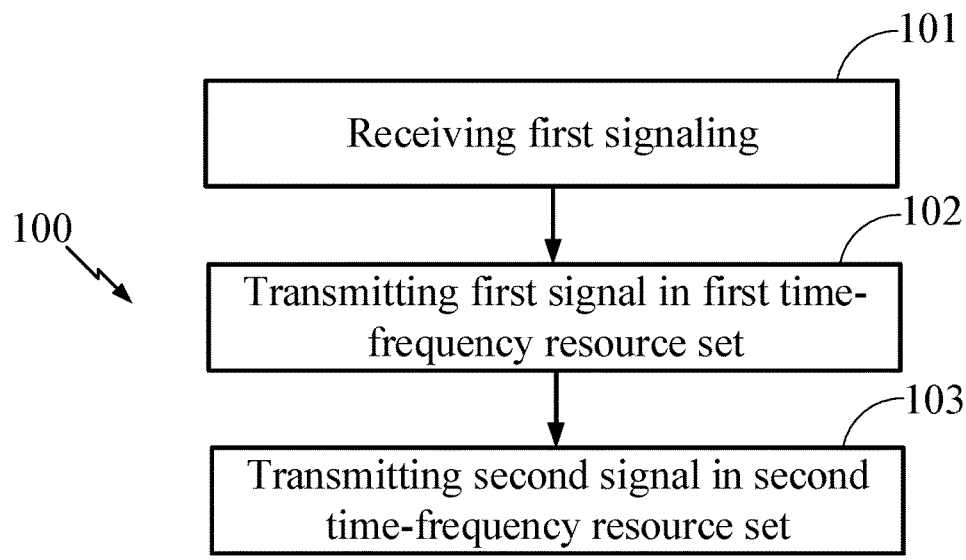
FIG. 1 illustrates a flowchart of a first signaling, a first signal and a second signal according to one embodiment of the present disclosure.

Embodiment 1 illustrates a flowchart of a first signaling, a second signal and a second signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first signaling in step 101; in step 102, transmits a first signal in a first time-frequency resource set; in step 103, transmits a second signal in a second time-frequency resource set; herein, the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

In one embodiment, the first signaling is a physical-layer signaling.

In one embodiment, the first signaling is a dynamic signaling.

In one embodiment, the first signaling carries Downlink Control Information (DCI).

In one embodiment, the first signaling carries Sidelink Control Information (SCI).

In one embodiment, the first signaling is a Physical Downlink Control Channel (PDCCH).

In one embodiment, the first signaling is a Physical Sidelink Control Channel (PSCCH).

In one embodiment, the first signaling is UE-Specific.

In one embodiment, the first signaling is Cell-Specific.

In one embodiment, the first signaling is transmitted through a PDCCH scrambled by a UE-Specific Radio Network Temporary Identity (RNTI).

In one embodiment, the first signaling is transmitted through a PDCCH scrambled by an SL-SPS-V-RNTI.

In one embodiment, the first signaling is transmitted through a PDCCH scrambled by an SL-V-RNTI.

In one embodiment, the first signaling is transmitted through an air interface.

In one embodiment, the first signaling is transmitted through a radio interface.

In one embodiment, the first signaling is transmitted through a PC5 interface.

In one embodiment, the first signaling is transmitted through a Uu interface.

In one embodiment, the first signaling is transmitted through a sidelink.

In one embodiment, the first signaling is carried by a baseband signal.

In one embodiment, the first signaling is carried by a Radio-Frequency (RF) signal.

In one embodiment, the first signaling is a Radio Resource Control (RRC) signaling.

In one embodiment, the first signaling is a higher-layer signaling.

In one embodiment, a DCI format adopted by the first signaling is format 3.

In one embodiment, the first signaling is used to configure sidelink transmission.

In one embodiment, the above phrase of "the first signaling being used to determine the first time-frequency resource set" includes the following meaning: the first signaling is used by the first node in the present disclosure to determine the first time-frequency resource set.

In one embodiment, the above phrase of "the first signaling being used to determine the first time-frequency resource set" includes the following meaning: the first signaling is used to directly indicate the first time-frequency resource set.

In one embodiment, the above phrase of "the first signaling being used to determine the first time-frequency resource set" includes the following meaning: the first signaling is used to indirectly indicate the first time-frequency resource set.

In one embodiment, the above phrase of "the first signaling being used to determine the first time-frequency resource set" includes the following meaning: the first signaling is used to explicitly indicate the first time-frequency resource set.

In one embodiment, the above phrase of "the first signaling being used to determine the first time-frequency resource set" includes the following meaning: the first signaling is used to implicitly indicate the first time-frequency resource set.

In one embodiment, the above phrase of "the first signaling being used to determine the first time-frequency resource set" includes the following meaning: the first signaling is used to determine time-domain resources comprised in the first time-frequency resource set.

In one embodiment, the above phrase of "the first signaling being used to determine the first time-frequency resource set" includes the following meaning: the first signaling is used to determine time-domain resources comprised in the first frequency-domain resource set.

In one embodiment, the above phrase of "the first signaling being used to determine the first time-frequency resource set" includes the following meaning: the first signaling is used to determine a start time of time-domain resources comprised in the first time-frequency resource set.

In one embodiment, the above phrase of "the first signaling being used to determine the first time-frequency resource set" includes the following meaning: time-frequency resources occupied by the first signaling are used to determine time-domain resources comprised in the first frequency-domain resource set.

In one embodiment, the above phrase of "the first signaling being used to determine the first time-frequency resource set" includes the following meaning: a length of a time interval between a start time of time-domain resources comprised in the first time-frequency resource set and an end time for receiving the first signaling is pre-defined.

In one embodiment, the above phrase of "the first signaling being used to determine the first time-frequency resource set" includes the following meaning: a length of a time interval between a start time of time-domain resources comprised in the first time-frequency resource set and an end time for receiving the first signaling is fixed.

In one embodiment, the above phrase of "the first signaling being used to determine the first time-frequency resource set" includes the following meaning: the first signaling is used to indicate a delay between a start time of time-domain resources comprised in the first time-frequency resource set and an end time for receiving the first signaling.

In one embodiment, the above phrase of "the first signaling being used to determine a reference time-frequency resource set" includes the following meaning: the first signaling is used by a first node in the present disclosure to determine the reference time-frequency resource set.

In one embodiment, the above phrase of "the first signaling being used to determine a reference time-frequency resource set" includes the following meaning: the first signaling is used to directly indicate the reference time-frequency resource set.

In one embodiment, the above phrase of "the first signaling being used to determine a reference time-frequency resource set" includes the following meaning: the first signaling is used to indirectly indicate the reference time-frequency resource set.

In one embodiment, the above phrase of "the first signaling being used to determine a reference time-frequency resource set" includes the following meaning: the first signaling is used to explicitly indicate the reference time-frequency resource set.

In one embodiment, the above phrase of "the first signaling being used to determine a reference time-frequency resource set" includes the following meaning: the first signaling is used to implicitly indicate the reference time-frequency resource set.

In one embodiment, the above phrase of "the first signaling being used to determine a reference time-frequency resource set" includes the following meaning: the first signaling is used to determine time-domain resources comprised in the reference time-frequency resource set.

In one embodiment, the above phrase of "the first signaling being used to determine a reference time-frequency resource set" includes the following meaning: the first signaling is used to determine a start time of time-domain resources comprised in the reference time-frequency resource set.

In one embodiment, the first time-frequency resource set occupies consecutive frequency-domain resources in frequency domain.

In one embodiment, the first time-frequency resource set occupies discrete frequency-domain resources in frequency domain.

In one embodiment, the first time-domain resource set occupies consecutive time-domain resources in frequency domain.

In one embodiment, the first time-domain resource set occupies discrete time-domain resources in frequency domain.

In one embodiment, the first time-frequency resource set comprises at least one Resource Element (RE).

In one embodiment, the first time-frequency resource set comprises time-domain resources required by Automatic Gain Control (AGC) in time domain.

In one embodiment, the first time-frequency resource set comprises time-domain resources required by a transmitting-receiving re-tune gap in time domain.

In one embodiment, the first time-frequency resource set comprises time-domain resources required by a frequency re-tune gap in time domain.

In one embodiment, the first signal occupies all time-frequency resources in the first time-frequency resource set.

In one embodiment, the first signal occupies partial time-frequency resources in the first time-frequency resource set.

In one embodiment, the first signal is a baseband signal.

In one embodiment, the first signal is a radio-frequency signal.

In one embodiment, the first signal is transmitted through an air interface.

In one embodiment, the first signal is transmitted through a radio interface.

In one embodiment, the first signal is transmitted through a PC5 interface.

In one embodiment, the first signal is transmitted through a Uu interface.

In one embodiment, the first signal is transmitted through a Sidelink.

In one embodiment, the first signal is used to carry a Transport Block (TB) carrying sidelink.

In one embodiment, the first signal is transmitted through a Sidelink Shared Channel (SL-SCH).

In one embodiment, the first signal is transmitted through a Physical Sidelink Shared Channel (PSSCH).

In one embodiment, the first signal is transmitted through a Physical Uplink Shared Channel (PUSCH).

In one embodiment, the first signal is transmitted through a PSCCH.

In one embodiment, the first signal carries SCI.

In one embodiment, the first signal is broadcast.

In one embodiment, the first signal is unicast.

In one embodiment, the first signal is groupcast.

In one embodiment, all or partial a Transport Block (TB) is used to generate the first radio signal.

In one embodiment, all or partial bits in a TB sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Upconversion to obtain the first signal.

In one embodiment, all or partial bits in a TB sequentially goes through CRC Calculation, Channel Coding, Rate Matching, Scrambling, Modulation, Layer Mapping, Antenna Port Mapping, Mapping to Virtual Resource Blocks, Mapping from Virtual to Physical Resource Blocks and OFDM Baseband Signal Generation to obtain the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks, OFDM Baseband Signal Generation and Modulation and Upconversion to obtain the first signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Antenna Port Mapping, Mapping to Virtual Resource Blocks, Mapping from Virtual to Physical Resource Blocks and OFDM Baseband Signal Generation to obtain the first signal.

In one embodiment, all or partial bits in a payload of an SCI sequentially goes through CRC Calculation, Channel Coding, Rate Matching, Scrambling, Modulation, Mapping to Physical Resources, OFDM Baseband Signal Generation, and Modulation and Upconversion to obtain the first signal.

In one embodiment, all or partial bits in a payload of an SCI sequentially goes through CRC Calculation, Channel Coding, Rate Matching, Scrambling, Modulation, Mapping to Physical Resources and OFDM Baseband Signal Generation to obtain the first signal.

In one embodiment, the second time-frequency resource set occupies consecutive frequency-domain resources in frequency domain.

In one embodiment, the second time-frequency resource set occupies discrete frequency-domain resources in frequency domain.

In one embodiment, the second time-domain resource set occupies consecutive time-domain resources in time domain.

In one embodiment, the second time-domain resource set occupies discrete time-domain resources in time domain.

In one embodiment, the second time-frequency resource set comprises at least one RE.

In one embodiment, the second time-frequency resource set comprises time-domain resources required by AGC in time domain.

In one embodiment, the second time-frequency resource set comprises time-domain resources required by a transmitting-receiving re-tune gap in time domain.

In one embodiment, the second time-frequency resource set comprises time-domain resources required by a frequency re-tune gap in time domain.

In one embodiment, the second signal occupies all time-frequency resources in the second time-frequency resource set.

In one embodiment, the second signal occupies partial time-frequency resources in the second time-frequency resource set.

In one embodiment, the second signal is a baseband signal.

In one embodiment, the second signal is an RF signal.

In one embodiment, the second signal is transmitted through an air interface.

In one embodiment, the second signal is transmitted through a radio interface.

In one embodiment, the second signal is transmitted through a PC5 interface.

In one embodiment, the second signal is transmitted through a Uu interface.

In one embodiment, the second signal is transmitted through an uplink.

In one embodiment, the second signal is transmitted through a Physical Uplink Control Channel (PUCCH).

In one embodiment, the second signal is transmitted through a Physical Uplink Shared Channel (PUSCH).

In one embodiment, the second signal is transmitted through an Uplink Shared Channel (UL-SCH).

In one embodiment, all or part of a characteristic sequence is used to generate the second signal.

In one embodiment, the second signal carries all or part of Uplink Control Information (UCI).

In one embodiment, the second signal carries a HARQ feedback.

In one embodiment, the second signal carries a sidelink HARQ feedback.

In one embodiment, all or part of a TB is used to generate the second radio signal.

In one embodiment, all or partial bits in a TB sequentially goes through CRC Calculation, Channel Coding, Rate Matching, Scrambling, Modulation, Layer Mapping, precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Channel Coding, Rate Matching, Scrambling, Modulation, Layer Mapping, Transform Precoding, Precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Channel Coding, Rate Matching, Scrambling, Modulation, Layer Mapping, precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Channel Coding, Rate Matching, Scrambling, Modulation, Layer Mapping, transform precoding, precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Transform Precoding, Precoding, Mapping to Virtual Resource Blocks, Mapping from Virtual to Physical Resource Blocks, OFDM Baseband Signal Generation and Modulation and Upconversion to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Precoding, Mapping to Virtual Resource Blocks, Mapping from Virtual to Physical Resource Blocks and OFDM Baseband Signal Generation to obtain the second signal.

In one embodiment, all or partial bits in a TB sequentially goes through CRC Calculation, Code Block Segmentation and Code Block CRC attachment, Channel Coding, Rate Matching, Code Block Concatenation, Scrambling, Modulation, Layer Mapping, Transform Precoding, Precoding, Mapping to Virtual Resource Blocks, Mapping from Virtual to Physical Resource Blocks and OFDM Baseband Signal Generation to obtain the second signal.

In one embodiment, all or partial bits in a payload of a UCI sequentially goes through Sequence Generation, Mapping to Physical Resources, OFDM Baseband Signal Generation and Modulation and Upconversion to obtain the second signal.

In one embodiment, all or partial bits in a payload of a UCI sequentially goes through Sequence Generation, Mapping to Physical Resources and OFDM Baseband Signal Generation to obtain the second signal.

In one embodiment, all or partial bits in a payload of a UCI sequentially goes through CRC Calculation, Channel Coding, Rate Matching, Scrambling, Modulation, Block-wise Spreading, Mapping to Physical Resources, OFDM Baseband Signal Generation and Modulation and Upconversion to obtain the second signal.

In one embodiment, all or partial bits in a payload of a UCI sequentially goes through CRC Calculation, Channel Coding, Rate Matching, Scrambling, Modulation, Block-wise Spreading, Transform Precoding, Mapping to Physical Resources, OFDM Baseband Signal Generation and Modulation and Upconversion to obtain the second signal.

In one embodiment, all or partial bits in a payload of a UCI sequentially goes through CRC Calculation, Channel Coding, Rate Matching, Scrambling, Modulation, Block-wise Spreading, Mapping to Physical Resources and OFDM Baseband Signal Generation to obtain the second signal.

In one embodiment, all or partial bits in a payload of a UCI sequentially goes through CRC Calculation, Channel Coding, Rate Matching, Scrambling, Modulation, Block-wise Spreading, Transform Precoding, Mapping to Physical Resources and OFDM Baseband Signal Generation to obtain the second signal.

In one embodiment, the reference time-frequency resource set occupies consecutive frequency-domain resources in frequency domain.

In one embodiment, the reference time-frequency resource set occupies discrete frequency-domain resources in frequency domain.

In one embodiment, the reference time-domain resource set occupies consecutive time-domain resources in time domain.

In one embodiment, the reference time-domain resource set occupies discrete time-domain resources in time domain.

In one embodiment, the reference time-frequency resource set comprises at least one RE.

In one embodiment, the reference time-frequency resource set comprises time-domain resources required by AGC in time domain.

In one embodiment, the reference time-frequency resource set comprises time-domain resources required by a transmitting-receiving re-tune gap in time domain.

In one embodiment, the reference time-frequency resource set comprises time-domain resources required by a frequency re-tune gap in time domain.

In one embodiment, the first TA quantity is a TA.

In one embodiment, the first TA quantity is a TA of uplink transmission when the first node in the present disclosure transmits the first signal.

In one embodiment, the first TA quantity is used to determine a TA of a timing for transmitting the second signal relative to a timing for receiving the first signaling.

In one embodiment, the first node in the present disclosure assumes that the first TA quantity remains unchanged within a time interval between transmitting the first signal and transmitting the second signal.

In one embodiment, the first node in the present disclosure assumes that the first TA quantity remains unchanged within a time interval between transmitting the first signal and transmitting the second signal and within a range of satisfying a timing error.

In one embodiment, the first node in the present disclosure assumes that a TA of an uplink transmission when the first signal is transmitted is equal to a TA of an uplink transmission when the second signal is transmitted.

In one embodiment, the first node in the present disclosure does not expect that the first TA quantity changes within a time interval between transmitting the first signal and transmitting the second signal and within a range of satisfying a timing error.

In one embodiment, the first node in the present disclosure does not expect that a TA of an uplink transmission when the first signal is transmitted is not equal to a TA of an uplink transmission when the second signal is transmitted.

In one embodiment, the first TA quantity belongs to higher-layer information.

In one embodiment, the first TA quantity belongs to all or part in MAC layer information.

In one embodiment, the first TA quantity belongs to all or partial a field in a MAC header.

In one embodiment, the first TA quantity belongs to all or partial a field in a MAC subheader.

In one embodiment, the first TA quantity belongs to all or partial a field in a MAC Control Element (CE).

In one embodiment, the first TA quantity belongs to all or partial a field in a MAC Payload.

In one embodiment, the first TA quantity is a non-negative real number.

In one embodiment, the first TA quantity is measured by μs.

In one embodiment, the first TA quantity is measured by s.

In one embodiment, the first TA quantity is equal to a TA of a start time when the first node transmits a signal later than the first signal relative to a downlink slot boundary.

In one embodiment, the first TA quantity is equal to a non-negative integer number of Tc, where Tc=1/(480000*4096) s.

In one embodiment, a reception timing of the first signaling is a downlink reception timing.

In one embodiment, the first TA quantity is equal to a TA for transmitting the second signal.

In one embodiment, the first TA quantity is equal to a sum of a first timing sub-advance and a second timing sub-advance, the first timing sub-advance is equal to a Round Trip Time (RTT) between the first node in the present disclosure and a transmitter of the first signaling, and the second timing sub-advance is configurable.

In one embodiment, the first TA quantity is equal to a sum of a first timing sub-advance and a second timing sub-advance, the first timing sub-advance is equal to a Round Trip Time (RTT) between the first node in the present disclosure and a transmitter of the first signaling, and the second timing sub-advance is related to a frequency range to which frequency-domain resources occupied by the second signal belong.

In one embodiment, the first TA quantity is equal to a sum of a first timing sub-advance and a second timing sub-advance, the first timing sub-advance is equal to a Round Trip Time (RTT) between the first node in the present disclosure and a transmitter of the first signaling, and the second timing sub-advance is related to a frequency range to which frequency-domain resources occupied by the second signal belong and an adopted duplex mode.

In one embodiment, the first TA quantity is equal to an RTT between the first node in the present disclosure and a transmitter of the first signaling.

In one embodiment, the first TA quantity is equal to a $T_{TA}$ when the first node in the present disclosure transmits the first signal.

In one embodiment, the first TA quantity is equal to a $(N_{TA}+N_{TA,offset})T_c$ when the first node in the present disclosure transmits the first signal.

In one embodiment, the first TA quantity is equal to a $N_{TA}T_c$ when the first node in the present disclosure transmits the first signal.

In one embodiment, the above phrase of "a first TA quantity being used to determine a TA quantity of an uplink timing relative to a downlink timing" includes the following meaning: the first TA quantity is equal to a TA quantity of an uplink timing relative to a downlink timing.

In one embodiment, the above phrase of "a first TA quantity being used to determine a TA quantity of an uplink timing relative to a downlink timing" includes the following meaning: the first TA quantity belongs to a part of a TA quantity of an uplink timing relative to a downlink timing.

In one embodiment, the above phrase of "a first TA quantity being used to determine a TA quantity of an uplink timing relative to a downlink timing" includes the following meaning: the first TA quantity is used to calculate a TA quantity of an uplink timing relative to a downlink timing.

In one embodiment, the above phrase of "a first TA quantity being used to determine a TA quantity of an uplink timing relative to a downlink timing" includes the following meaning: the first TA quantity is used to determine a time advance quantity of a start time for transmitting a first uplink radio frame relative to a start time for receiving a downlink radio frame corresponding to the first uplink radio frame, and the first uplink radio frame is an uplink radio frame when the first node transmitting the first radio signal.

In one embodiment, the above phrase of "a first TA quantity being used to determine a TA quantity of an uplink timing relative to a downlink timing" includes the following meaning: the first TA quantity is used to determine a TA of a start time for transmitting a first uplink radio frame relative to a start time for receiving a downlink radio frame corresponding to the first uplink radio frame, and the first uplink radio frame is an uplink frame.

In one embodiment, the above phrase of "a first TA quantity being used to determine a TA quantity of an uplink timing relative to a downlink timing" includes the following meaning: the first TA quantity is used to determine a TA of an uplink transmission timing relative to a downlink reception timing.

In one embodiment, the above phrase of "a first TA quantity being used to determine a TA quantity of an uplink timing relative to a downlink timing" includes the following meaning: the first TA quantity is used to determine an uplink TA of the first node in the present disclosure.

In one embodiment, the above phrase of "a first TA quantity being used to determine a TA quantity of an uplink timing relative to a downlink timing" includes the following meaning: the first TA quantity is used to determine a timing difference between an uplink frame and a downlink frame with a same frame index.

In one embodiment, the above phrase of "a first TA quantity being used to determine a TA quantity of an uplink timing relative to a downlink timing" includes the following meaning: the first TA quantity is used to determine a boundary distance in time domain between an uplink frame and a downlink frame with a same frame index.

In one embodiment, a carrier to which the first time-frequency resource set belongs in frequency domain is different from a carrier to which the second time-frequency resource set belongs in frequency domain.

In one embodiment, a carrier to which the first time-frequency resource set belongs in frequency domain is the same as a carrier to which the second time-frequency resource set belongs in frequency domain.

In one embodiment, frequency-domain resources occupied by the first time-frequency resource set in frequency domain belong to a licensed spectrum, and frequency-domain resources occupied by the second time-frequency resource set in frequency domain belong to an unlicensed spectrum.

In one embodiment, frequency-domain resources occupied by the first time-frequency resource set in frequency domain belong to a licensed spectrum, and frequency-domain resources occupied by the second time-frequency resource set in frequency domain belong to an Intelligent Transport System (ITS) special spectrum.

In one embodiment, frequency-domain resources occupied by the first time-frequency resource set in frequency domain belong to a licensed spectrum, and frequency-domain resources occupied by the second time-frequency resource set in frequency domain belong to a licensed spectrum.

In one embodiment, the second signal is used to indicate whether the first signal is correctly received.

In one embodiment, the second signal is used to indicate Channel Status Information (CSI) of sidelink.

In one embodiment, the second signal is used to indicate a HARQ-ACK and CSI of sidelink.

In one embodiment, the second signal is used to indicate a Power Headroom Report (PHR) of sidelink.

In one embodiment, the second signal is used to indicate a Scheduling Request (SR) of sidelink.

In one embodiment, the second signal is used to indicate a Buffer Status Report (BSR) of sidelink.

In one embodiment, the first time length is greater than or equal to 0.

In one embodiment, X is equal to 2.

In one embodiment, X is equal to 3.

In one embodiment, X is equal to 2 or X is equal to 3.

In one embodiment, X is greater than 3.

In one embodiment, there exists one of the X candidate time lengths being equal to 0.

In one embodiment, any of the X candidate time lengths is not less than 0.

In one embodiment, there exists one of the X candidate time lengths being equal to a time length of one slot.

In one embodiment, for an SCS of a subcarrier comprised in the second time-frequency resource set in frequency domain, there exists one of X candidate time lengths being equal to a time length of one slot.

In one embodiment, for an SCS of a subcarrier comprised in the second time-frequency resource set in frequency domain, there exists one of X candidate time lengths being equal to a time length of two slots.

In one embodiment, any of the X candidate time lengths is equal to a time length of a non-negative integral multiple of a slot.

In one embodiment, any two of the X candidate time lengths being different.

In one embodiment, for a given SCS, any of the X candidate time lengths is equal to a time length of a non-negative integral multiple of a slot.

In one embodiment, for an SCS of a subcarrier adopted by the second signal, any of the X candidate time lengths is equal to a time length of a non-negative integral multiple of a slot.

In one embodiment, any of the X candidate time lengths is equal to a time length of a non-negative integral multiple of a OFDM symbol.

In one embodiment, for a given SCS, any of the X candidate time lengths is equal to a time length of a non-negative integral multiple of a OFDM symbol.

In one embodiment, for an SCS of a subcarrier adopted by the second signal, any of the X candidate time lengths is equal to a time length of a non-negative integral multiple of a OFDM symbol.

In one embodiment, the above phrase of "the first TA quantity being used to determine the first time length out of the X candidate time lengths" includes the following meaning: the first TA quantity is used by the first node in the present disclosure to determine the first time length out of the X candidate time lengths.

In one embodiment, the above phrase of "the first TA quantity being used to determine the first time length out of the X candidate time lengths" includes the following meaning: the first TA quantity is used to determine the first time length out of the X candidate time lengths according to a mapping relation.

In one embodiment, the above phrase of "the first TA quantity being used to determine the first time length out of the X candidate time lengths" includes the following meaning: the first TA quantity is used to determine the first time length out of the X candidate time lengths according to an operation relation.

In one embodiment, the above phrase of "the first TA quantity being used to determine the first time length out of the X candidate time lengths" includes the following meaning: the first TA quantity is used to determine the first time length out of the X candidate time lengths according to a functional relation.

In one embodiment, the above phrase of "the first TA quantity being used to determine the first time length out of the X candidate time lengths" includes the following meaning: the first TA quantity is used to directly determine the first time length out of the X candidate time lengths.

In one embodiment, the above phrase of "the first TA quantity being used to determine the first time length out of the X candidate time lengths" includes the following meaning: the first TA quantity is used to indirectly determine the first time length out of the X candidate time lengths.

In one embodiment, a target receiver of the first signal is different from a target receiver of the second signal.

In one embodiment, a target receiver of the second signal is the second node in the present disclosure.

In one embodiment, a target receiver of the first signal is a node other than the second node in the present disclosure.

In one embodiment, a target receiver of the second signal is a receiver of the second signal expected by the first node in the present disclosure.

In one embodiment, a target receiver of the first signal is a receiver of the first signal expected by the first node in the present disclosure.

In one embodiment, a receiver of the first signal expected by the first node in the present disclosure is the same as a receiver of a second signal expected by the first node in the present disclosure.

In one embodiment, a receiver of the first signal expected by the first node in the present disclosure is a UE, and a receiver of a second signal expected by the first node in the present disclosure is a base station.

In one embodiment, a scrambling sequence of the first signal is different from a scrambling sequence of the second signal.

In one embodiment, a characteristic identifier of a target receiver carried by the first signal is different from a characteristic identifier of a target receiver carried by the second signal.

In one embodiment, the first receiver receives second information, herein, the second information is used to determine a time length of a time interval between a start time for receiving the third signaling and an end time of the first time-frequency resource set in time domain.

Embodiment 2

Figure 2:
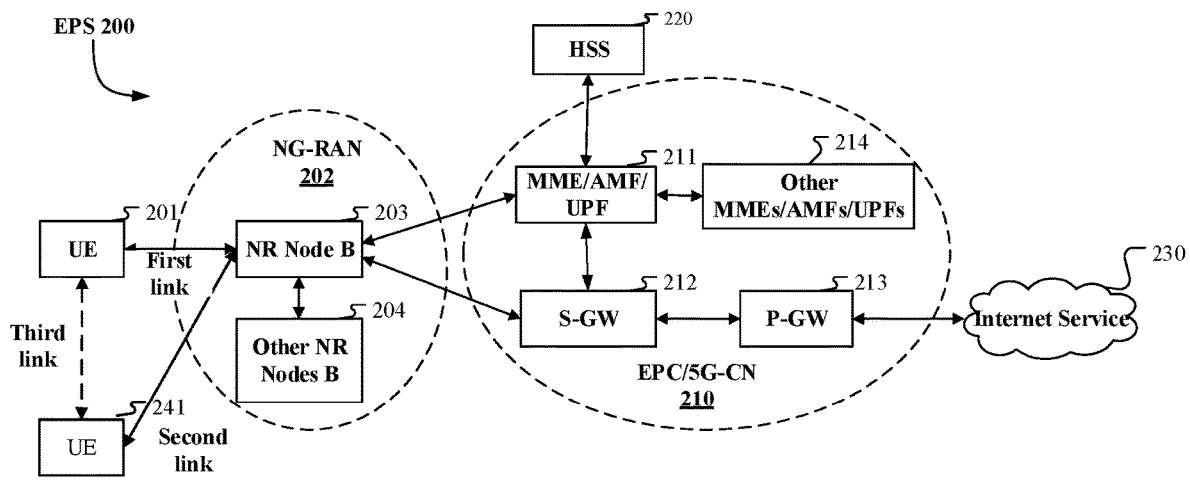
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. In V2X network, the gNB 203 may be a base station, a terrestrial base station relayed via a satellites or a Road Side Unit (RSU) and etc. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, communication units in vehicles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, a vehicle terminal, V2X equipment or some other appropriate terms. The gNB 203 is connected to the EPC/5G-CN 210 via an SING interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports transmission in sidelink.

In one embodiment, the UE 201 supports a PC5 interface.

In one embodiment, the UE 201 supports Internet of Vehicles (IoV).

In one embodiment, the UE 201 supports V2X traffic.

In one embodiment, the gNB 201 corresponds to the second node in the present disclosure.

In one embodiment, the gNB 201 supports IIoVs.

In one embodiment, the gNB 201 supports V2X traffic.

Embodiment 3

Figure 3:
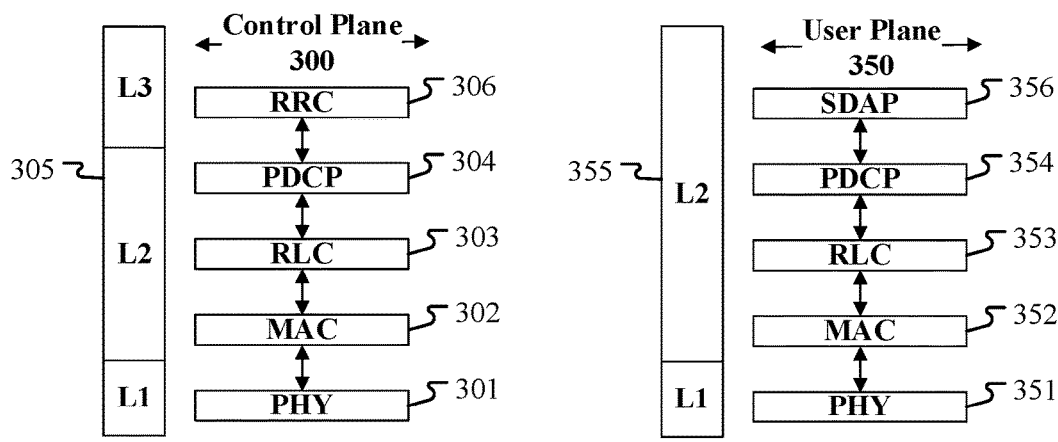
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or vehicle equipment or vehicle-mounted communication module in V2X) and a second node (gNB, UE or vehicle equipment or vehicle-mounted communication module in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The RRC sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the first signal in the present disclosure is generated by the RRC 306.

In one embodiment, the first signal in the present disclosure is generated by the MAC 302 or the MAC 352.

In one embodiment, the first signal in the present disclosure is generated by the PHY 301 or the PHY 351.

In one embodiment, the second signal in the present disclosure is generated by the MAC 302 or the MAC 352.

In one embodiment, the second signal in the present disclosure is generated by the PHY 301 or the PHY 351.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY 301 or the PHY 351.

Embodiment 4

Figure 4:
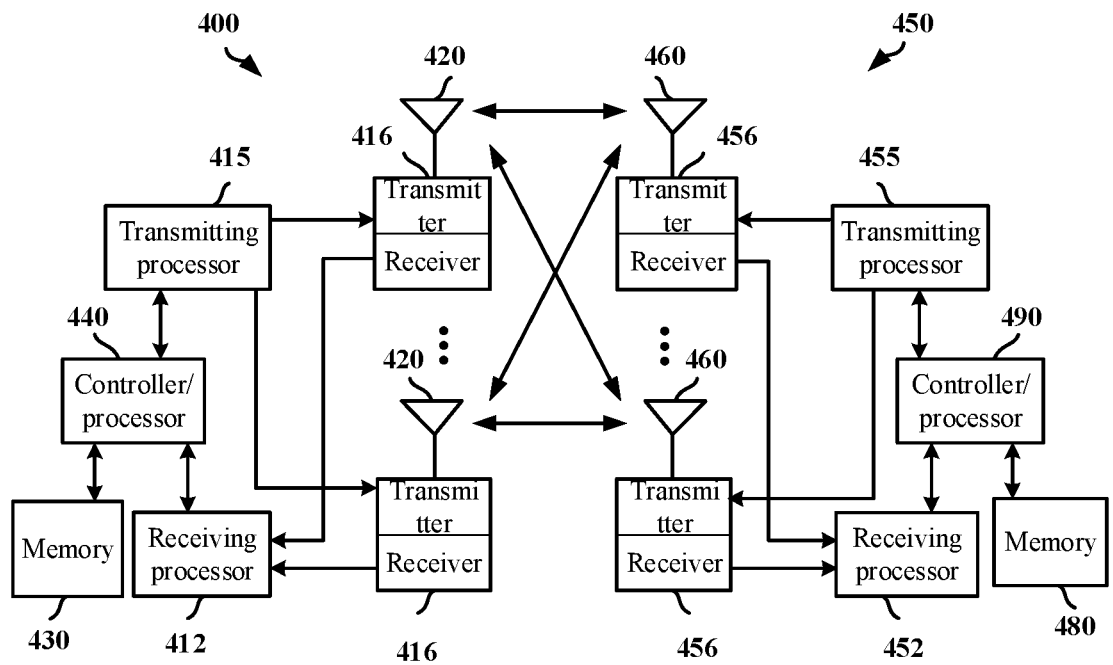
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460. The data source/buffer 480 provides a higher-layer packet to the controller/processor 490, the controller/processor 490 provides header compression and decompression, encryption and decryption, packet segmentation and reordering and multiplexing and demultiplexing between a logical channel and a transport channel so as to implement the L2 layer and above layer protocols used for the user plane and the control plane. The higher layer packet may comprise data or control information, such as DL-SCH, UL-SCH or SL-SCH. The transmitting processor 455 performs various signal transmitting processing functions used for the L1 layer (that is, PHY), including coding, interleaving, scrambling, modulation, power control/allocation and generation of physical layer control signaling, the receiving processor 452 performs various signal receiving processing functions used for the L1 layer (that is, PHY), including decoding, deinterleaving, descrambling, demodulation, deprecoding and extraction of physical layer control signaling. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second node (410) may comprise a controller/processor 440, a data source/buffer 430, a receiving processor 412, a transmitter/receiver 416 and a transmitting processor 415, wherein the transmitter/receiver 416 comprises an antenna 420. The data source/buffer 430 provides a higher layer packet to the controller/processor 440, the controller/processor 440 provides header compression and decompression, encryption and decoding, packet segmentation and reordering, as well as a multiplexing between a logical channel and a transport channel so as to implement the L2 layer protocols used for the user plane and the control plane; The higher layer packet may comprise data or control information, such as DL-SCH or UL-SCH or SL-SCH. The transmitting processor 415 provides various signal transmitting processing functions used for the L1 layer (that is, PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, deinterleaving, descrambling, demodulation, deprecoding and extraction of physical layer signaling. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink, a higher-layer packet, such as high-layer information comprised in the first information and the first signaling (if higher-layer information is comprised in the first signaling) in the present disclosure, is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, the first information and the first signaling in the present disclosure (if higher layer information is comprised in the first signaling) are all generated at the controller/processor 440. The transmitting processor 415 implements various signal processing functions on the L1 layer (i.e., physical layer), including coding, interleaving, scrambling, modulation, power control/distribution, precoding, and generation of a physical-layer control signaling, etc. The generation of a physical layer signal carrying the first information and the first signaling in the present disclosure are completed at the transmitting processor 415, The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. and the modulated symbols are divided into parallel streams and each stream is mapped onto a corresponding multi-carrier subcarrier and/or multi-carrier symbol, which is latter mapped from the transmitting processor 415 to the antenna 420 via the transmitter 416 to be transmitted in the form of RF signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function includes receiving a physical layer signal carrying the first information and the first signaling in the present disclosure, demodulating based on various modulation schemes (e.g., BPSK, and QPSK) via a multicarrier symbol in a multicarrier symbol stream, then descrambling, decoding and deinterleaving to recover data or a control signal transmitted by the second node 410 on a physical channel, and then providing the data and the control signal to the controller/processor 490. The controller/processor 490 is in charge of the function of L2 layer and above layers, and the controller/processor 490 interprets the first information and the first signaling in the present disclosure (if higher layer information is comprised in the first signaling). The controller/processor can be connected to a memory 480 that stores program code and data. The memory 480 may be called a computer readable medium.

In UL transmission, the data source/memory 480 provides higher-layer data to the controller/processor 490. The data source/buffer 480 represents all protocol layers of the L2 layer and above the L2 layer. The controller/processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, retransmission of a lost packet, and a signaling to the second node 410. The second signal in the present disclosure (when higher layer data is carried in the second signal) is generated at the data source/buffer 480 or at the controller/processor 490. The transmitting processor 455 provides various signal transmitting processing functions for the L1 layer (that is, PHY). The generation of a physical layer signal carrying the second signal in the present disclosure is completed in the transmitting processor 415. The signal transmission processing functions include coding and interleaving so as to facilitate Forward Error Correction (FEC) at the UE 450 as well as modulation of baseband signals based on various modulation schemes (i.e., BPSK, QPSK). The modulated symbols are divided into parallel streams and each stream is mapped onto a corresponding multicarrier subcarrier and/or multicarrier symbol, which is later mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 provides various signal receiving and processing functions for the L1 layer (i.e., PHY), including receiving and processing a physical layer signal carrying the second signal, the signal receiving and processing function includes acquisition of multi-carrier symbol streams, demodulation based on each modulation scheme (i.e., BPSK, QPSK), then the decoding and de-interleaving to recover data and/or node 450 on the PHY. The data and the control signal are then provided to the controller/processor 440. The controller/processor 440 performs functions of L2 layer, including interpreting information carried by the second signal in the present disclosure. The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first signaling; transmits a first signal in a first time-frequency resource set; and transmits a second signal in a second time-frequency resource set; the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

In one embodiment, the first node 450 comprises a memory that stores a computer readable instruction program. The computer readable instruction program generates an action when executed by at least one processor. The action includes: receiving a first signaling; transmitting a first signal in a first time-frequency resource set; and transmitting a second signal in a second time-frequency resource set; the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first signaling; receives a second signal in a second time-frequency resource set; the first signaling is used to determine the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1.

In one embodiment, the second node 410 comprises a memory that stores a computer readable instruction program. The computer readable instruction program generates an action when executed by at least one processor. The action includes: transmitting a first signaling; and receiving a second signal in a second time-frequency resource set; the first signaling is used to determine the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1.

In one embodiment, the first node 450 is a UE.

In one embodiment, the first node 450 is a UE that supports V2X.

In one embodiment, the first node 450 is a vehicle equipment.

In one embodiment, the first node 450 is a Road Side Unit (RSU) device.

In one embodiment, the second node 410 is a base station (gNB/eNB).

In one embodiment, the second node 410 is a base station that supports V2X.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the first signaling in the present disclosure.

In one embodiment, the transmitter 456 (including the antenna 460), the transmitting processor 455 and the controller/processor 490 are to transmit the second signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the first signaling in the present disclosure.

In one embodiment, the receiver 416 (including the antenna 420), the receiving processor 412 and the controller/processor 440 are used to receive the second signal in the present disclosure.

Embodiment 5

Figure 5:
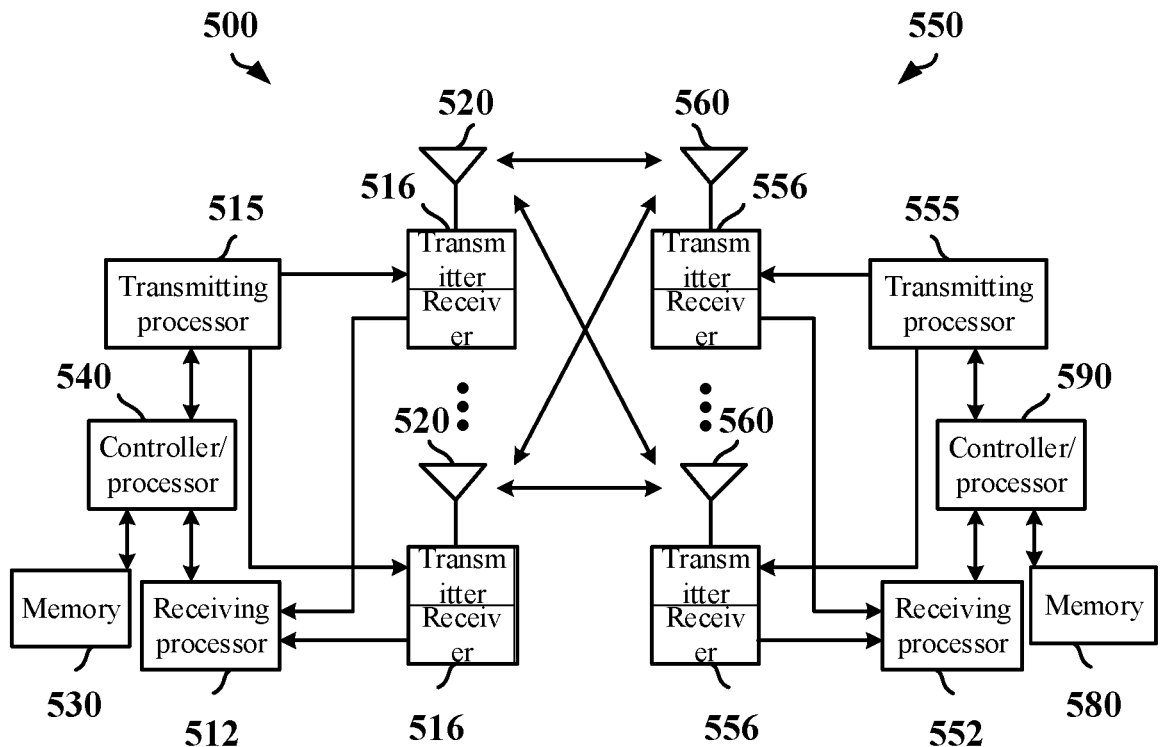
FIG. 5 illustrates a schematic diagram of a first node and another UE according to one embodiment of the present disclosure.

Embodiment 5 illustrates a schematic diagram of a first node and another UE according to the present disclosure, as shown in FIG. 5.

The first node (550) comprises a controller/processor 590, a memory 580, a receiving processor 552, a transmitter/receiver 556, and a transmitting processor 555, the transmitter/receiver 556 comprising an antenna 560. A higher layer packet is provided to the controller/processor 590 by the data source, the controller/processor 590 provides header compression, encryption, packet segmentation and reordering, and a multiplexing between a logical channel and a transport channel so as to implement the L2 layer protocols used for the user plane and the control plane; the higher layer packet may comprise data or control information, such as DL-SCH, UL-SCH or SL-SCH. The transmitting processor 555 performs various signal transmitting processing functions of the L1 layer (i.e., PHY), including coding, interleaving, scrambling, modulation, power control/allocation, precoding and physical layer control signaling generation. The receiving processor 552 performs various signal receiving processing functions of the L1 layer (i.e., PHY), including decoding, de-interleaving, descrambling, demodulation, de-precoding and physical layer control signaling extraction. The transmitter 556 is configured to convert a baseband signal provided by the transmitting processor 555 into an RF signal to be transmitted via the antenna 560, the receiver 556 is configured to convert the RF signal received via the antenna 560 into a baseband signal to be provided to the receiving processor 552. Composition in the another UE (500) is the same as that in the first node 550.

In sidelink transmission, a higher layer packet, comprising the first signal and the second signaling (if the second signaling carries higher layer information) in the present disclosure, is provided to the controller/processor 590, and the controller/processor 590 implements the function of the L2 layer. In sidelink transmission, the controller/processor 590 provides header compression, encryption, packet segmentation and reordering, and multiplexing between a logical channel and a transport channel. The controller/processor 590 is also responsible for HARQ operation (if supported), repeat transmission, and a signaling (comprising the second signaling in the present disclosure) to the UE 500. The transmitting processor 555 implements various signal processing functions for L1 layer (that is, physical layer), comprising coding, interleaving, scrambling, modulation, power control/distribution, precoding and generation of physical layer control signaling, generation of a physical layer signal carrying the first signal and the second signaling in the present disclosure is completed at the transmitting processor 555, modulation symbols are divided into parallel streams and each stream is mapped to a corresponding multicarrier subcarrier and/or multicarrier symbol, which is later mapped from the transmitting processor 555 to the antenna 560 via the transmitter 556 to be transmitted in the form of RF signal. At the receiving side, each receiver 516 receives an RF signal via a corresponding antenna 520, each receiver 516 recovers baseband information modulated to the RF carrier and provides the baseband information to the receiving processor 512. The receiving processor 512 performs signal receiving processing functions of the L1 layer. The signal receiving and processing function includes receiving the first signal and the second signaling in the present disclosure, demodulating based on various modulation schemes (e.g., BPSK, and QPSK) via a multicarrier symbol in a multicarrier symbol stream, then descrambling, decoding and deinterleaving to recover a data or control signal transmitted by the first communication node 550 on a physical channel, and providing the data and the control signal to the controller/processor 540. The controller/processor 540 implements the L2 layer, and the controller/processor 540 interprets the first signal and the second signaling (if the second signaling carries higher layer information) in the present disclosure. The controller/processor can be connected to a memory 530 that stores program code and data. The memory 530 may be called a computer readable medium. In particular, the third signaling in the present disclosure, is generated in the transmitting processor 515 in the UE 500, and then mapped to the antenna 520 via the transmitter 516 and transmitted in the form of an RF signal. At the receiving end, each receiver 556 receives the RF signal of the third signaling through its corresponding antenna 560, each receiver 556 recovers the baseband information modulated on the RF carrier and provides the baseband information to the receiving processor 552, and the receiving processor 552 interprets the third signaling in the present disclosure.

In one embodiment, the transmitter 556 (including the antenna 560), the transmitting processor 555 and the controller/processor 590 are to transmit the first signal in the present disclosure.

In one embodiment, the transmitter 556 (including the antenna 560), the transmitting processor 555 and the controller/processor 590 are to transmit the first signaling in the present disclosure.

In one embodiment, the receiver 556 (including the antenna 560) and the receiving processor 552 are used to receive the third signaling in the present disclosure.

In one embodiment, the receiver 516 (including the antenna 520), the receiving processor 512 and the controller/processor 540 are used to receive the first signal in the present disclosure.

In one embodiment, the receiver 516 (including the antenna 520), the receiving processor 512 and the controller/processor 540 are used to receive the first signaling in the present disclosure.

In one embodiment, the transmitter 516 (including the antenna 520), the transmitting processor 515 and the controller/processor 540 are used to transmit the third signaling in the present disclosure.

Embodiment 6

Figure 6:
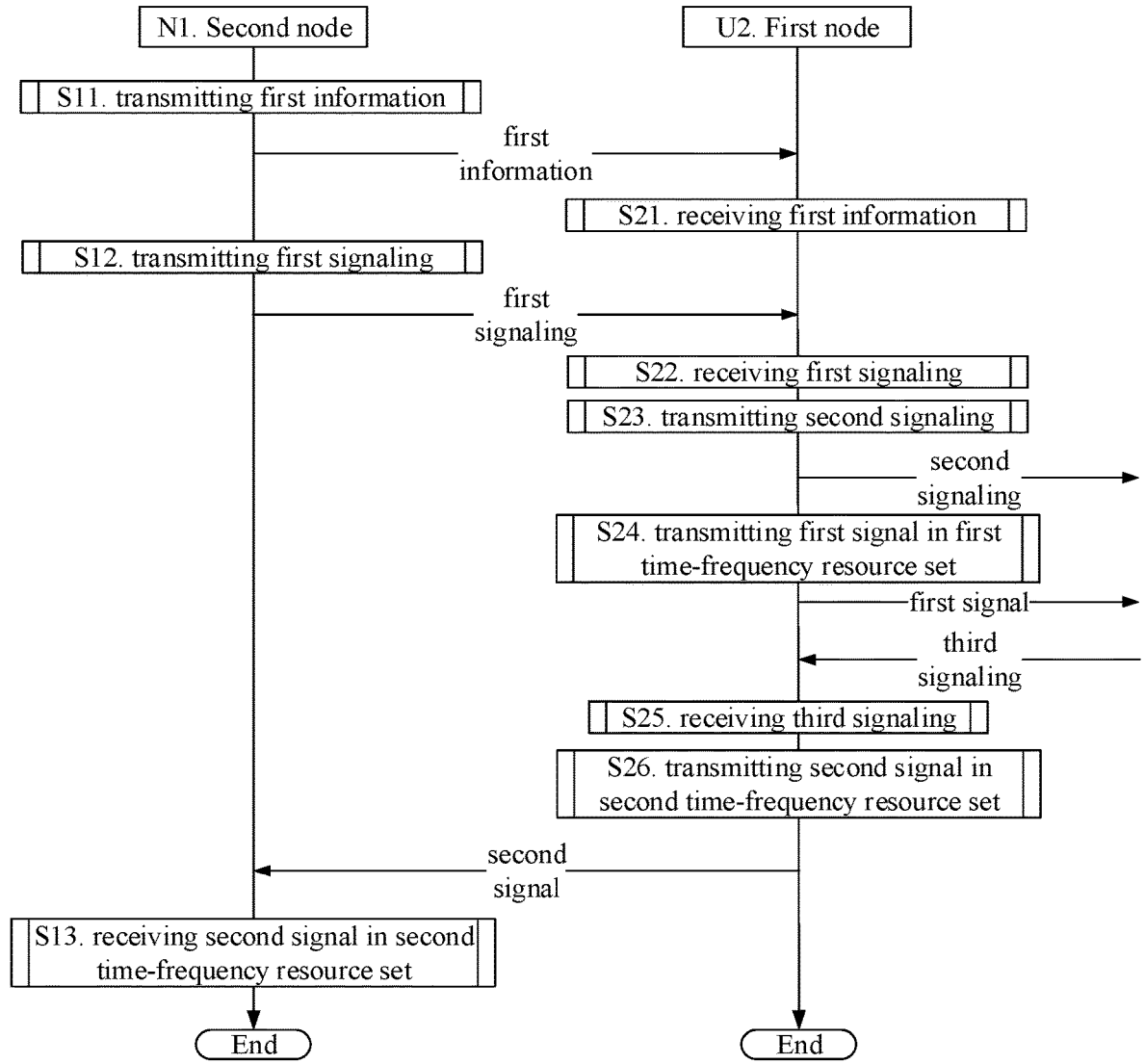
FIG. 6 illustrates a flowchart of transmission of a radio signal according to one embodiment of the present disclosure.

Embodiment 6 illustrates a flowchart of transmission of a radio signal according to one embodiment of the present disclosure, as shown in FIG. 6. In FIG. 6, a second node N1 is a maintenance base station of a serving cell of a first node U2, particularly, the order in the embodiment does not limit the order of signal transmission and implementation in the present disclosure.

The second node N1 transmits first information in step S11, transmits a first signaling in step S12, and receives a second signal in a second time-frequency resource set in step S13.

The first node U2 receives first information in step S21, receives a first signaling in step S22, transmits a second signaling in step S23, transmits a first signal in a first time-frequency resource set in step S24, receives a third signaling in step S25, and transmits a second signal in a second time-frequency resource set in step S26.

In embodiment 6, the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths; the second signaling is used to indicate at least one of time-frequency resources occupied by the first signal, or an MCS adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling; the first information is used to determine the first TA quantity, and the first information is transmitted via an air interface.

In one embodiment, the first information is higher-layer information.

In one embodiment, the first information is transmitted by a higher-layer signaling.

In one embodiment, the first information is transmitted by a physical-layer signaling.

In one embodiment, the first information comprises all or part of a higher-layer signaling.

In one embodiment, the first information comprises all or part of a physical-layer signaling.

In one embodiment, the first information comprises all or partial Information Elements (IEs) in a RRC signaling.

In one embodiment, the first information comprises all or partial fields in an IE in an RRC signaling.

In one embodiment, the first information comprises all or partial fields in a MAC layer signaling.

In one embodiment, the first information comprises all or part of a MAC CE.

In one embodiment, the first information comprises all or part of a MAC header.

In one embodiment, the first information comprises all or part of a MAC payload of a Random Access Response (RAR).

In one embodiment, the first information is a TA command.

In one embodiment, the first information is a TA update.

In one embodiment, the first information comprises all or part of Msg2 in random access procedure.

In one embodiment, the first information comprises all or part of MsgB in random access procedure.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is unicast.

In one embodiment, the first information is Cell-Specific.

In one embodiment, the first information is UE-Specific.

In one embodiment, the first information is UE group-specific.

In one embodiment, the first information is transmitted through a PDCCH.

In one embodiment, the first information comprises all or partial fields of a DCI signaling.

In one embodiment, the phrase of "the first information being used to determine the first TA quantity" includes the following meaning: the first information is used by the first communication node to determine the first TA quantity.

In one embodiment, the phrase of "the first information being used to determine the first TA quantity" includes the following meaning: the first information directly indicates the first TA quantity.

In one embodiment, the phrase of "the first information being used to determine the first TA quantity" includes the following meaning: the first information indirectly indicates the first TA quantity.

In one embodiment, the phrase of "the first information being used to determine the first TA quantity" includes the following meaning: the first information explicitly indicates the first TA quantity.

In one embodiment, the phrase of "the first information being used to determine the first TA quantity" includes the following meaning: the first information implicitly indicates the first TA quantity.

In one embodiment, the air interface is a radio interface.

In one embodiment, the air interface is an interface between a second node and the first node in the present disclosure.

In one embodiment, the air interface is a Uu interface.

Embodiment 7

Figure 7:
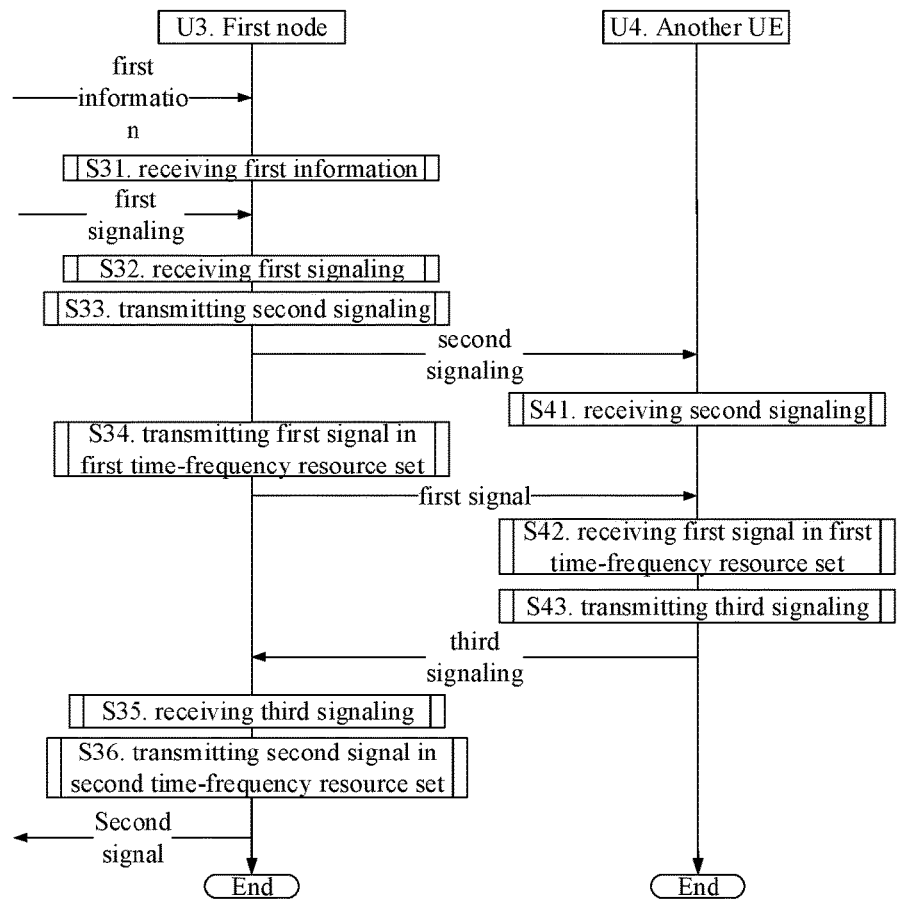
FIG. 7 illustrates a flowchart of transmission of a radio signal according to another embodiment of the present disclosure.

Embodiment 7 illustrates a flowchart of transmission of a radio signal according to another embodiment in the present disclosure, as shown in FIG. 7. In FIG. 7, a first node U3 and another UE U4 are in communications via sidelink.

The first node U3 receives first information in step S31, receives a first signaling in step S32, transmits a second signaling in step S33, transmits a first signal in a first time-frequency resource set in step S34, receives a third signaling in step S35, and transmits a second signal in a second time-frequency resource set in step S36.

Another UE U4 receives a second signaling in step S41, receives a first signal in a first time-frequency resource set, and transmits a third signaling in step S43.

In embodiment 7, the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths; the second signaling is used to indicate at least one of time-frequency resources occupied by the first signal, or an MCS adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling; the first information is used to determine the first TA quantity, and the first information is transmitted via an air interface.

In one embodiment, a target receiver of the second signaling is the same as a target receiver of the first signal.

In one embodiment, a receiver of the second signaling expected by the first node in the present disclosure is the same as a receiver of the first signal.

In one embodiment, a receiver of the second signaling expected by the first node in the present disclosure comprises a receiver of the first signal expected by the first node in the present disclosure.

In one embodiment, a receiver of the second signaling expected by the first node in the present disclosure comprises a receiver other than a receiver of the first signal expected by the first node in the present disclosure.

In one embodiment, a receiver of the second signaling expected by the first node in the present disclosure comprises a receiver of the first signal expected by the first node in the present disclosure and a receiver other than a receiver of the first signal expected by the first node in the present disclosure.

In one embodiment, a receiver of the second signaling expected by the first node in the present disclosure comprises more than one communication node.

In one embodiment, a transmitter of the third signaling is a receiver of the second signaling expected by the first node in the present disclosure.

In one embodiment, a receiver of the second signaling expected by the first node in the present disclosure comprises a transmitter of the third signaling.

In one embodiment, a transmitter of the third signaling is a receiver of the first signal expected by the first node in the present disclosure.

In one embodiment, a receiver of the first signal expected by the first node in the present disclosure comprises a transmitter of the third signaling.

In one embodiment, the above phrase of "a transmitter of the third signaling being different from a transmitter of the first signaling" includes the following meaning: the third signaling and the first signaling are transmitted through different radio interfaces.

In one embodiment, the above phrase of "a transmitter of the third signaling being different from a transmitter of the first signaling" includes the following meaning: the third signaling is transmitted through a PC5 interface, and the first signaling is transmitted through a Uu interface.

In one embodiment, the above phrase of "a transmitter of the third signaling being different from a transmitter of the first signaling" includes the following meaning: a type of a transmitter of the third signaling is different from a type of a transmitter of the first signaling.

In one embodiment, the above phrase of "a transmitter of the third signaling being different from a transmitter of the first signaling" includes the following meaning: a transmitter of the third signaling is a UE, and a transmitter of the first signaling is a base station (gNB or eNB).

Embodiment 8

Figure 8:
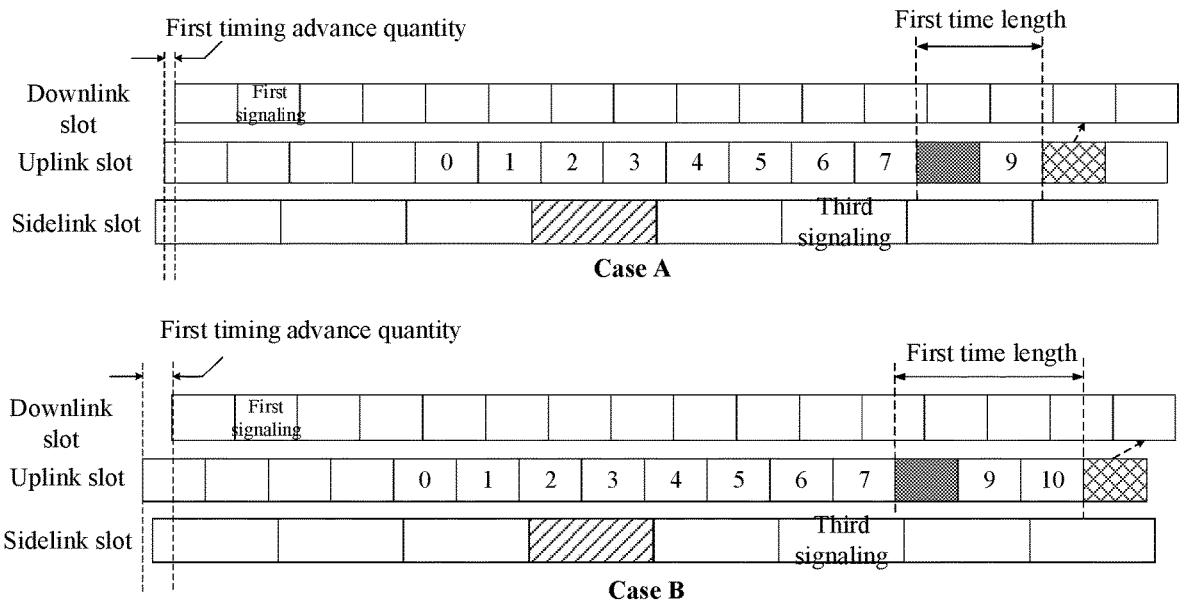
FIG. 8 illustrates a schematic diagram of a relation between a first TA quantity and a first time length according to one embodiment of the present disclosure.

Embodiment 8 illustrates a schematic diagram of a relation between a first TA quantity and a first time length according to one embodiment of the present disclosure, as shown in FIG. 8. In FIG. 8, each rectangle represents a slot, the slash-filled rectangle represent time-domain resources in a first time-frequency resource set, the dot-filled rectangle represents time-domain resources in a reference time-frequency resource set, and the cross-line filled rectangle represent time-domain resources in a second time-frequency resource set; in case A, a first time length is equal to a time length of two uplink slots; and in case B, a first time length is equal to a time length of three uplink slots.

In embodiment 8, the first signaling in the present disclosure is used to determine the first time-frequency resource set in the present disclosure, and the first signaling is used to determine a reference time-frequency resource set; a first TA quantity is used to determine a TA quantity of an uplink timing relative to a downlink timing; a time length of a time interval between a start time of the second time-frequency resource set in the present disclosure in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

Embodiment 9

Embodiment 9 illustrates a schematic diagram of relations among a first signal, a second signaling and a third signaling according to one embodiment of the present disclosure, as shown in FIG. 9. In FIG. 9, the horizontal axis represents time, the vertical axis represents frequency, the slash-filled rectangle represents time-frequency resources occupied by a second signaling, the area outside the slash-filled rectangle in the solid-line framed area represents time-frequency resources occupied by a first signal, and the cross-line filled rectangle represents time-frequency resources occupied by a third signal.

In embodiment 9, the second signaling in the present disclosure is used to indicate at least one of time-frequency resources occupied by the first signal in the present disclosure, or an MCS adopted by the first signal; the third signaling in the present disclosure is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling.

In one embodiment, the second signaling is unicast.

In one embodiment, the second signaling is groupcast.

In one embodiment, the second signaling is broadcast.

In one embodiment, the second signaling comprises a first stage SCI in 2-Stage SCIs.

In one embodiment, the second signaling comprises a second stage SCI in 2-Stage SCIs.

In one embodiment, a receiver of the second signaling expected by the first node in the present disclosure is a node other than the second node in the present disclosure.

In one embodiment, a receiver of the second signaling expected by the first node in the present disclosure is a UE.

In one embodiment, the second signaling is transmitted through an air interface.

In one embodiment, the second signaling is transmitted through a radio interface.

In one embodiment, the second signaling is transmitted through a PC5 interface.

In one embodiment, the second signaling is transmitted through a Uu interface.

In one embodiment, the second signaling is transmitted through sidelink.

In one embodiment, the second signaling is carried by a baseband signal.

In one embodiment, the second signaling is carried by an RF signal.

In one embodiment, the second signaling is a physical-layer signaling.

In one embodiment, the second signaling is a higher-layer signaling.

In one embodiment, the second signaling carries SCI.

In one embodiment, the second signaling carries partial or all fields in an SCI.

In one embodiment, the second signaling is transmitted through a PSCCH.

In one embodiment, the second signaling is transmitted through a PSSCH.

In one embodiment, the second signaling comprises all or partial IEs in a Radio Resource Control signaling.

In one embodiment, the second signaling comprises all or partial fields in an Information Element (IE) in an RRC signaling.

In one embodiment, the above phrase of "the second signaling being used to determine at least one of time-frequency resources occupied by the first signal or an MSC adopted by the first signal" includes the following meaning: the second signaling is used by the first node in the present disclosure to indicate at least one of time-frequency resources occupied by the first signal, or an MCS adopted by the first signal.

In one embodiment, the above phrase of "the second signaling being used to determine at least one of time-frequency resources occupied by the first signal or an MSC adopted by the first signal" includes the following meaning: the second signaling is used to directly indicate at least one of time-frequency resources occupied by the first signal, or an MCS adopted by the first signal.

In one embodiment, the above phrase of "the second signaling being used to determine at least one of time-frequency resources occupied by the first signal or an MSC adopted by the first signal" includes the following meaning: the second signaling is used to indirectly indicate at least one of time-frequency resources occupied by the first signal, or an MCS adopted by the first signal.

In one embodiment, the above phrase of "the second signaling being used to determine at least one of time-frequency resources occupied by the first signal or an MSC adopted by the first signal" includes the following meaning: the second signaling is used to explicitly indicate at least one of time-frequency resources occupied by the first signal, or an MCS adopted by the first signal.

In one embodiment, the above phrase of "the second signaling being used to determine at least one of time-frequency resources occupied by the first signal or an MSC adopted by the first signal" includes the following meaning: the second signaling is used to implicitly indicate at least one of time-frequency resources occupied by the first signal, or an MCS adopted by the first signal.

In one embodiment, the above phrase of "the second signaling being used to determine at least one of time-frequency resources occupied by the first signal or an MSC adopted by the first signal" includes the following meaning: the second signaling is used to indicate time-frequency resources occupied by the first signal.

In one embodiment, the above phrase of "the second signaling being used to determine at least one of time-frequency resources occupied by the first signal or an MSC adopted by the first signal" includes the following meaning: the first signaling is used to indicate an MCS adopted by the first signal.

In one embodiment, the above phrase of "the second signaling being used to determine at least one of time-frequency resources occupied by the first signal or an MSC adopted by the first signal" includes the following meaning: the second signaling is used to indicate time-frequency resources occupied by the first signal and an MCS adopted by the first signal.

In one embodiment, the third signaling is a baseband signal.

In one embodiment, the third signaling is an RF signal.

In one embodiment, the third signaling is transmitted via an air interface.

In one embodiment, the third signaling is transmitted through a radio interface.

In one embodiment, the third signaling is transmitted through a PC5 interface.

In one embodiment, the third signaling is transmitted through a Uu interface.

In one embodiment, the third signaling is transmitted through sidelink.

In one embodiment, the third signaling is transmitted through a Physical Sidelink Feedback Channel (PSFCH).

In one embodiment, all or part of a characteristic sequence is used to generate the third signaling.

In one embodiment, all or part of a Zadoff-Chu (ZC) sequence is used to generate the third signaling.

In one embodiment, the third signaling carries all or part of Sidelink Feedback Control Information (SFCI).

In one embodiment, the third signaling carries a HARQ feedback.

In one embodiment, the third signaling carries a HARQ Non-Acknowledge (NACK) feedback.

In one embodiment, the above phrase of "the third signaling being used to determine whether the first signal is correctly received" includes the following meaning: the third signaling is used by the first node in the present disclosure to determine whether the first signal is correctly received.

In one embodiment, the above phrase of "the third signaling being used to determine whether the first signal is correctly received" includes the following meaning: the third signaling is used to directly indicate whether the first signal is correctly received.

In one embodiment, the above phrase of "the third signaling being used to determine whether the first signal is correctly received" includes the following meaning: the third signaling is used to indirectly indicate whether the first signal is correctly received.

In one embodiment, the above phrase of "the third signaling being used to determine whether the first signal is correctly received" includes the following meaning: the third signaling is used to explicitly indicate whether the first signal is correctly received.

In one embodiment, the above phrase of "the third signaling being used to determine whether the first signal is correctly received" includes the following meaning: the third signaling is used to implicitly indicate whether the first signal is correctly received.

In one embodiment, the above phrase of "the third signaling being used to determine whether the first signal is correctly received" includes the following meaning: the third signaling is used to indicate that the first signal is not correctly received.

In one embodiment, radio resources occupied by the third signaling comprise time-frequency resources occupied by the third signaling.

In one embodiment, radio resources occupied by the third signaling comprise code-domain resources occupied by the third signaling.

In one embodiment, radio resources occupied by the third signaling comprise time-frequency resources and code-domain resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used by a first node in the present disclosure to determine radio resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: time-frequency resources occupied by the second signaling are used to determine radio resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: time-frequency resources occupied by the first signal are used by a first node in the present disclosure to determine radio resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: time-frequency resources occupied by the second signaling and time-frequency resources occupied by the first signal are used together to determine radio resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine code-domain resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine a sequence generating the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine time-frequency resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine code-domain resources and time-frequency resources occupied by the third signaling.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine radio resources occupied by the third signaling according to a mapping relation.

In one embodiment, the above phrase of "at least one of time-frequency resources occupied by the second signaling or time-frequency resources occupied by the first signal being used to determine radio resources occupied by the third signaling" includes the following meanings: at least one of time-frequency resources occupied by the second signaling or time-frequency resources occupied by the first signal are used to determine radio resources occupied by the third signaling according to a corresponding relation.

In one embodiment, the above phrase of "at least one of time-frequency resources occupied by the second signaling or time-frequency resources occupied by the first signal being used to determine radio resources occupied by the third signaling" includes the following meanings: radio resources occupied by the third signaling are respectively associated with at least one of time-frequency resources occupied by the second signaling or time-frequency resources occupied by the first signal.

Embodiment 10

Embodiment 10 illustrates a schematic diagram of X candidate time lengths according to one embodiment of the present disclosure, as shown in FIG. 10. In FIG. 10, the first column on the left represents a time length TDL-SL of a time interval between an end time for receiving the first signaling and a start time for transmitting the first signal, the second column on the left represents an SCS of a subcarrier comprised in the first time-frequency resource set in frequency domain, the third column on the left represents an SCS of a subcarrier comprised in the second time-frequency resource set in frequency domain, and the fourth column on the left represents a set of X candidate time lengths (unit for measurement is uplink slot) where A represents a delay configured by the first signaling.

In embodiment 10, a time length of a time interval between an end time for receiving the first signaling in the present disclosure and a start time for transmitting the first signal, an SCS of a subcarrier comprised in the first time-frequency resource set in the present disclosure and an SCS of a subcarrier comprised in the second time-frequency resource set in frequency domain are used together to determine the X candidate time lengths in the present disclosure.

In one embodiment, an end time for receiving the first signaling refers to an end time for receiving a slot to which time-domain resources occupied by the first signaling belong in time domain.

In one embodiment, an end time for receiving the first signaling refers to a time when an end time for transmitting the first signaling to the first node in the present disclosure is after a propagation delay.

In one embodiment, an end time for receiving the first signaling refers to a time ½ the first TA quantity later than an end time for transmitting the first signaling.

In one embodiment, an end time for receiving the first signaling refers to an end time for receiving a downlink slot to which time-domain resources occupied by the first signaling belong in time domain.

In one embodiment, an end time for receiving the first signaling refers to an end time for receiving an OFDM symbol occupied by the first signaling in time domain.

In one embodiment, an end time for receiving the first signaling refers to for an SCS of a subcarrier occupied by the first signaling in frequency domain, an end time for receiving a slot to which time-domain resources occupied by the first signaling belong in time domain.

In one embodiment, an end time for receiving the first signaling refers to for an SCS of a subcarrier occupied by the first signaling in frequency domain, an end time for receiving an OFDM symbol occupied by the first signaling in time domain.

In one embodiment, a start time for transmitting the first signal refers to a start time of time-domain resources comprised in the first time-frequency resource set in time domain.

In one embodiment, a start time for transmitting the first signal refers to a start time of a slot to which time-domain resources occupied by the first signal belong.

In one embodiment, a start time for transmitting the first signal refers to a start time for transmitting a sidelink slot to which time-domain resources occupied by the first signal belong.

In one embodiment, a start time for transmitting the first signal refers to a start time for transmitting a sidelink slot to which an OFDM symbol occupied by the first signal belongs.

In one embodiment, a start time for transmitting the first signal refers to a start time for transmitting an earliest OFDM symbol among all OFDM symbols occupied by the first signal.

In one embodiment, the first time-frequency resource set comprise more than one subcarrier in frequency domain, and an SCS of any two subcarriers comprised in the first time-frequency resource set in frequency domain is equal.

In one embodiment, the second time-frequency resource set comprise more than one subcarrier in frequency domain, and an SCS of any two subcarriers comprised in the second time-frequency resource set in frequency domain is equal.

In one embodiment, the first time-frequency resource set comprise more than one subcarrier in frequency domain, and an SCS of any two subcarriers comprised in the first time-frequency resource set in frequency domain is equal.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain are used together by the first node in the present disclosure to determine the X candidate time lengths.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal is equal to a sum of a first time sub-length and a second time sub-length, the first signaling indicates the first time sub-length, and the second time sub-length, an SCS of a subcarrier comprised in the first time-frequency resource set in frequency domain and an SCS of a subcarrier comprised in the second time-frequency resource set in frequency domain are used together to determine the X candidate time lengths.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: the second time length, an SCS of a subcarrier comprised in the first time-frequency resource set in frequency domain and an SCS of a subcarrier comprised in the second time-frequency resource set are used together to determine the X candidate time lengths.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a ratio between an SCS of a subcarrier comprised in the second time-frequency resource set in frequency domain and an SCS of a subcarrier comprised in the first time-frequency resource set in frequency domain is equal to a first ratio, and one of the X candidate time lengths is linearly associated with the first ratio; for a given SCS of a subcarrier comprised in the second time-frequency resource set in frequency domain, one of the X candidate time lengths is linearly associated with a time length of a time interval between an end time for receiving the first signaling and a start time for transmitting the first signal.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a ratio between an SCS of a subcarrier comprised in the second time-frequency resource set in frequency domain and an SCS of a subcarrier comprised in the first time-frequency resource set in frequency domain is equal to a first ratio, and one of the X candidate time lengths is linearly associated with the first ratio; for a given SCS of a subcarrier comprised in the second time-frequency resource set in frequency domain, one of the X candidate time lengths is linearly associated with the second time length in the present disclosure.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal is equal to a sum of a first time sub-length and a second time sub-length, and the first signaling indicates the first time sub-length; a ratio between an SCS of a subcarrier comprised in the second time-frequency resource set in frequency domain and an SCS of a subcarrier comprised in the first time-frequency resource set in frequency domain is equal to a first ratio, and one of the X candidate time lengths is linearly associated with the first ratio; for a given SCS of a subcarrier comprised in the second time-frequency resource set in frequency domain, one of the X candidate time lengths is linearly associated with the second time sub-length.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal is equal to a sum of a first time sub-length and a second time sub-length, and the first signaling indicates the first time sub-length; a ratio between an SCS of a subcarrier comprised in the second time-frequency resource set in frequency domain and an SCS of a subcarrier comprised in the first time-frequency resource set in frequency domain is equal to a first ratio, and one of the X candidate time lengths is linearly associated with the first ratio; a ratio of the second time sub-length to a time length of a slot to which time-domain resources comprised in the second time resource set belong is equal to a second ratio, one of the X candidate time lengths is linearly associated with the second ratio.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal is equal to a sum of a first time sub-length and a second time sub-length, and the first signaling indicates the first time sub-length; a ratio between an SCS of a subcarrier comprised in the second time-frequency resource set in frequency domain and an SCS of a subcarrier comprised in the first time-frequency resource set in frequency domain is equal to a first ratio, and one of the X candidate time lengths is in a positive linear association with a rounded-up value of the first ratio; a ratio of the second time sub-length to a time length of a slot to which time-domain resources comprised in the second time resource set belong is equal to a second ratio, and one of the X candidate time lengths is in a linear negative association with a rounded-down value of the second ratio.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: for given an SCS of a subcarrier comprised in the first time-frequency resource set in frequency domain and an SCS of a subcarrier comprised in the second time-frequency resource set in frequency domain, one of the X candidate time lengths is linearly associated with a time length of a time interval between an end time for receiving the first signaling and a start time for transmitting the first signal; for a given SCS of a subcarrier comprised in the first time-frequency resource set in frequency domain, one of the X candidate time lengths is linearly associated with an SCS of a subcarrier comprised in the second time-frequency resource set in frequency domain; for a given SCS of a subcarrier comprised in the second time-frequency resource set in frequency domain, one of the X candidate time lengths is linearly associated with a reciprocal of an SCS of a subcarrier comprised in the first time-frequency resource set in frequency domain.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" includes the following meaning: a time length of a time interval between an end time for receiving the first signaling and a start time for transmitting the first signal, an SCS of a subcarrier comprised in the first time-frequency resource set in frequency domain, and an SCS of a subcarrier comprised in the second time-frequency resource set in frequency domain are used together to determine one of the X candidate lengths.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" is implemented through the following formula:

$$t\_offset = \left\lceil \frac{SCS_{UL}}{SCS_{SL}} \right\rceil - \left\lfloor \frac{T\_delay}{T\_slot\_UL} \right\rfloor$$

herein, t_offset represents a number of slots corresponding to one of the X candidate time lengths, $SCS_{SL}$ represents an SCS of a subcarrier comprised in the first time-frequency resource set in frequency domain, $SCS_{UL}$ represents an SCS of a subcarrier comprised in the second time-frequency resource set in frequency domain, a time length of a time interval between an end time for receiving the first signaling and a start time for transmitting the first signal is equal to a sum of a first time sub-length and a second time sub-length, the first signaling indicates the first time sub-length, T_delay represents the second time sub-length, and T_slot_UL represents a time length of a slot to which time-domain resources comprised in the second time-frequency resource set belong.

In one embodiment, the above phrase of "a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain being used together to determine the X candidate time lengths" is implemented through the following formula:

$$t\_offset = \left\lceil \frac{SCS_{UL}}{SCS_{SL}} \right\rceil - \left\lfloor \frac{T\_delay}{T\_slot\_UL} \right\rfloor$$

herein, t_offset represents a number of slots corresponding to one of the X candidate time lengths, $SCS_{SL}$ represents an SCS of a subcarrier comprised in the first time-frequency resource set, $SCS_{UL}$ represents an SCS of a subcarrier comprised in the second time-frequency resource set in frequency domain, T_delay represents the second time length in the present disclosure, and T_slot_UL represents a time length of a slot to which time-domain resources comprised in the second time-frequency resource set belong.

Embodiment 11

Embodiment 11 illustrates a schematic diagram of a first time length according to one embodiment of the present disclosure, as shown in FIG. 11. In FIG. 11, the first column on the left represents a difference value between a third time length and a second time length, and the second column on the left represents a first time length.

In embodiment 11, a time length of a time interval between an end time for receiving the first signaling in the present disclosure and a start time of the first time-frequency resource set in the present disclosure in time domain is used to determine a second time length, a time length of a slot in slots to which time-domain resources comprised in the first time-frequency resource set belong is equal to a third time length, a magnitude relation between a difference value of the third time length and the second time length and the first TA quantity in the present disclosure is used to determine the first time length in the present disclosure out of the X candidate time lengths in the present disclosure.

In one embodiment, the above phrase of "a time length of a time interval between an end time for receiving the first signaling and a start time of the first time-frequency resource set in time domain being used to determine a second time length" includes the following meaning: a time length of a time interval between an end time for receiving the first signaling and a start time of the first time-frequency resource set in time domain is used by the first node in the present disclosure to determine the second time length.

In one embodiment, the above phrase of "a time length of a time interval between an end time for receiving the first signaling and a start time of the first time-frequency resource set in time domain being used to determine a second time length" includes the following meaning: a time length of a time interval between an end time for receiving the first signaling and a start time of the first time-frequency resource set in time domain is equal to the second time length.

In one embodiment, the above phrase of "a time length of a time interval between an end time for receiving the first signaling and a start time of the first time-frequency resource set in time domain being used to determine a second time length" includes the following meaning: the first signaling indicates a first time sub-length, a difference value between a time length of a time interval between an end time for receiving the first signaling and a start time of the first time-frequency resource set in time domain and the first time sub-length is equal to the second time length.

In one embodiment, the above phrase of "a time length of a time interval between an end time for receiving the first signaling and a start time of the first time-frequency resource set in time domain being used to determine a second time length" includes the following meaning: a difference value of a time length of a time interval between an end time for receiving the first signaling and a start time of the first time-frequency resource set in time domain and the first delay in the present disclosure plus ½ of the first TA quantity is equal to the second time length In one embodiment, the above phrase of "a time length of a time interval between an end time for receiving the first signaling and a start time of the first time-frequency resource set in time domain being used to determine a second time length" includes the following meaning:

$$T\_delay = T_{PDCCH\text{-}PSSCH} + \frac{T_{TA}}{2} - T_{offset}$$

herein, T_delay represents the second time length, $T_{PDCCH\text{-}PSSCH}$ represents a time length of a time interval between an end time for receiving the first signaling and a start time of the first time-frequency resource set in time domain, $T_{TA}$ represents the first TA quantity, and $T_{offset}$ is indicated by the first signaling.

In one embodiment, the above phrase of "a time length of a time interval between an end time for receiving the first signaling and a start time of the first time-frequency resource set in time domain being used to determine a second time length" includes the following meaning:

$$T\_delay = T_{PDCCH\text{-}PSSCH} + \frac{T_{TA}}{2} - T_{offset}$$

herein, T_delay represents the second time length, $T_{PDCCH\text{-}PSSCH}$ represents a time length of a time interval between an end time for receiving the first signaling and a start time of the first time-frequency resource set in time domain, $T_{TA}$ represents the first TA quantity, and $T_{offset}$ represents the first delay in the present disclosure.

In one embodiment, the second time length is greater than or equal to 0.

In one embodiment, the second time length is equal to a non-negative integral multiple of Tc, where Tc=1/(480000*4096) s.

In one embodiment, a slot to which time-domain resources comprised in the first time-frequency resource set belong is a sidelink slot.

In one embodiment, a slot to which time-domain resources comprised in the first time-frequency resource set belong is a slot corresponding to an SCS of a subcarrier comprised in the first time-frequency resource set in frequency domain.

In one embodiment, time-domain resources comprised in the first time-frequency resource set all belong to a same slot.

In one embodiment, time-domain resources comprised in the first time-frequency resource set belong to a plurality of slots.

In one embodiment, the above phrase of "a magnitude relation between a difference value between the third time length and the second time length and the first TA quantity being used to determine the first time length out of the X candidate time lengths" includes the following meaning: a magnitude relation between a difference value between the third time length and the second time length and the first TA quantity is used by the first node in the present disclosure to determine the first time length out of the X candidate time lengths.

In one embodiment, the above phrase of "a magnitude relation between a difference value between the third time length and the second time length and the first TA quantity being used to determine the first time length out of the X candidate time lengths" includes the following meaning: a magnitude relation between a difference value between the third time length and the second time length and the first TA quantity is used to determine the first time length out of the X candidate time lengths according to a mapping relation.

In one embodiment, the above phrase of "a magnitude relation between a difference value between the third time length and the second time length and the first TA quantity being used to determine the first time length out of the X candidate time lengths" includes the following meaning: a first candidate time length and a second candidate time length are respectively two unequal candidate time lengths among the X candidate time lengths; when a difference value between the third time length and the second time length is greater than or equal to the first TA quantity, the first time length is equal to the first candidate time length; and when a difference value between the third time length and the second time length is less than the first TA quantity, the first time length is equal to the second candidate time length.

In one embodiment, the above phrase of "a magnitude relation between a difference value between the third time length and the second time length and the first TA quantity being used to determine the first time length out of the X candidate time lengths" includes the following meaning: X is equal to 2, and the X candidate time lengths are respectively time lengths of 0 slot and t_offset slot(s); when a difference value between the third time length and the second time length is greater than or equal to the first TA quantity, the first time length is equal to a time length of t_offset slot(s); and when a difference value between the third time length and the second time length is less than the first TA quantity, the first time length is equal to 0.

In one embodiment, the above phrase of "a magnitude relation between a difference value between the third time length and the second time length and the first TA quantity being used to determine the first time length out of the X candidate time lengths" includes the following meaning: X is equal to 2, and the X candidate time lengths are respectively time lengths of 0 slot and t_offset slot(s); when a difference value between the third time length and the second time length is greater than or equal to the first TA quantity, the first time length is equal to a time length of t_offset slot(s); when a difference value between the third time length and the second time length is less than the first TA quantity, the first time length is equal to 0; where t_offset is obtained through the following meaning:

$$t\_offset = \left\lceil \frac{SCS_{UL}}{SCS_{SL}} \right\rceil - \left\lfloor \frac{T\_delay}{T\_slot\_UL} \right\rfloor$$

herein, $SCS_{SL}$ represents an SCS of a subcarrier comprised in the first time-frequency resource set in frequency domain, $SCS_{UL}$ represents an SCS of a subcarrier comprised in the second time-frequency resource set in frequency domain, T_delay represents the second time length in the present disclosure, T_slot_UL represents a time length of a slot to which time-domain resources comprised in the second time-frequency resource set.

In one embodiment, the above phrase of "a magnitude relation between a difference value between the third time length and the second time length and the first TA quantity being used to determine the first time length out of the X candidate time lengths" includes the following meaning: an SCS of a subcarrier comprised in the first time-frequency resource set in frequency domain is equal to a first SCS, and an SCS of a subcarrier comprised in the second time-frequency resource set in frequency domain is equal to a second SCS; a magnitude relation between a difference value between the third time length and the second time length and the first TA quantity and a magnitude relation between the first SCS and the second SCS are used together to determine the first time length out of the X candidate time lengths.

In one embodiment, the above phrase of "a magnitude relation between a difference value between the third time length and the second time length and the first TA quantity being used to determine the first time length out of the X candidate time lengths" includes the following meaning: a first candidate time length, a second candidate time length and a third candidate time length are respectively three candidate time lengths among the X candidate time lengths; an SCS of a subcarrier comprised in the first time-frequency resource set in frequency domain is equal to a first SCS, and an SCS of a subcarrier comprised in the second time-frequency resource set in frequency domain is equal to a second SCS; when a difference value between the third time length and the second time length is less than the first TA quantity, the first time length is equal to the first candidate time length; when the first SCS is less than or equal to the second SCS and when a difference value between the third time length and the second time length is greater than or equal to the first TA quantity, the first time length is equal to the second candidate time length; when the first SCS is greater than the second SCS and when a difference value between the third time length and the second time length is greater than or equal to the first TA quantity, the first time length is equal to the third candidate time length.

In one embodiment, the above phrase of "a magnitude relation between a difference value between the third time length and the second time length and the first TA quantity being used to determine the first time length out of the X candidate time lengths" includes the following meaning: an SCS of a subcarrier comprised in the first time-frequency resource set in frequency domain is equal to a first SCS, and an SCS of a subcarrier comprised in the second time-frequency resource set in frequency domain is equal to a second SCS; X is equal to 3, and the X candidate time lengths are respectively 0 and 1 slot and t_offset slot(s); when a difference value between the third time length and the second time length is less than the first TA quantity, the first time length is equal to 0; when the first SCS is less than or equal to the second SCS and when a difference value between the third time length and the second time length is greater than or equal to the first TA quantity, the first time length is equal to t_offset slot(s); when the first SCS is greater than the second SCS and when a difference value between the third time length and the second time length is greater than or equal to the first TA quantity, the first time length is equal to 1 slot; where t_offset is obtained through the following meaning formula:

$$\text{t\_offset} = \left\lceil \frac{SCS_{UL}}{SCS_{SL}} \right\rceil - \left\lfloor \frac{T\_delay}{T\_slot\_UL} \right\rfloor$$

herein, $SCS_{SL}$ represents an SCS of a subcarrier comprised in the first time-frequency resource set in frequency domain, $SCS_{UL}$ represents an SCS of a subcarrier comprised in the second time-frequency resource set in frequency domain, T_delay represents the second time length in the present disclosure, and T_slot_UL represents a time length of a slot to which time-frequency resources comprised in the second time-frequency resource set belong.

Embodiment 12

Embodiment 12 illustrates a schematic diagram of a first slot according to one embodiment of the present disclosure, as shown in FIG. 12. In FIG. 12, each rectangle in the top row represents a slot in downlink, each rectangle in the middle row represents a slot in uplink, and each rectangle in the bottom row represents a slot in sidelink.

In embodiment 12, the first signaling in the present disclosure is used to determine a first delay, and the first TA quantity and the first delay in the present disclosure are used together to determine a first reference delay; a start time of the first time-frequency resource set in the present disclosure in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

In one embodiment, the above phrase of "the first signaling being used to a first delay" includes the following meaning: the first signaling is used by the first node in the present disclosure to determine the first delay.

In one embodiment, the above phrase of "the first signaling being used to a first delay" includes the following meaning: the first signaling is used to directly indicate the first delay.

In one embodiment, the above phrase of "the first signaling being used to a first delay" includes the following meaning: the first signaling is used to indirectly indicate the first delay.

In one embodiment, the above phrase of "the first signaling being used to a first delay" includes the following meaning: the first signaling is used to explicitly indicate the first delay.

In one embodiment, the above phrase of "the first signaling being used to a first delay" includes the following meaning: the first signaling is used to implicitly indicate the first delay.

In one embodiment, the first delay is equal to a time length of a non-negative integer number of slot(s).

In one embodiment, the first delay is equal to a time length of a positive integer number of slot(s).

In one embodiment, the first delay is greater than 0.

In one embodiment, the first delay is greater than or equal to 0.

In one embodiment, the first delay is equal to a time length of a non-negative integral number of sidelink slot(s).

In one embodiment, the first delay is equal to a time length of a positive integer number of sidelink slot(s).

In one embodiment, the first delay is equal to a time length of a non-negative integer number of downlink slot(s).

In one embodiment, the first delay is equal to a time length of positive integer number of downlink slot(s).

In one embodiment, the first delay is equal to a time length of a non-negative integral number of uplink slot(s).

In one embodiment, the first delay is equal to a time length of positive integer number of uplink slot(s).

In one embodiment, for an SCS of a subcarrier comprised in the first time-frequency resource set in frequency domain, the first delay is equal to a time length of a non-negative integer number of slot(s).

In one embodiment, for an SCS of a subcarrier comprised in the first time-frequency resource set in frequency domain, the first delay is equal to a time length of a positive integer number of slot(s).

In one embodiment, the first delay is equal to a time length of a positive integer number of OFDM symbol(s).

In one embodiment, the first delay is equal to a time length of at least one Tc, where Tc=1/(480000*4096) s.

In one embodiment, the above phrase of "the first TA quantity and the first delay being used together to determine a first reference delay" includes the following meaning: the first TA quantity and the first delay are used together by the first node in the present disclosure to determine the first reference delay.

In one embodiment, the above phrase of "the first TA quantity and the first delay being used together to determine a first reference delay" includes the following meaning: a sum of a half of the first TA quantity and the first delay is equal to the first reference delay.

In one embodiment, an SCS of a subcarrier comprised in the first time-frequency resource set in frequency domain and an SCS of a subcarrier of a subcarrier occupied by the first signaling in frequency domain are used to determine the first reference delay.

In one embodiment, a ratio of an SCS of a subcarrier comprised in the first time-frequency resource set in frequency domain to an SCS of a subcarrier occupied by the first signaling in frequency domain is used to determine the first reference delay.

In one embodiment, the first slot is a sidelink slot.

In one embodiment, the first slot is a slot corresponding to an SCS of a subcarrier comprised in the first time-frequency resource set in frequency domain.

In one embodiment, a start time of the first time-frequency resource set in time domain is a start time of earliest time-domain resources in all time-domain resources comprised in the first time-frequency resource set in time domain.

In one embodiment, a start time of the first slot is later than an end time for receiving the first signaling.

In one embodiment, a start time of the first slot is equal to an end time for receiving the first signaling.

In one embodiment, the above phrase of "a length of a time interval between a start time of the first slot and an end time for receiving the first signaling being not less than an earliest slot of the first reference delay" includes the following meaning: in a carrier to which the second time-frequency resource set belongs in frequency domain, the first slot belongs to a first slot set, the first slot set comprises at least one slot, a length of a time interval between a start time of any slot in the first slot set and an end time for receiving the first signaling is not less than the first reference delay, and the first slot is a slot with an earliest start time in the first slot set.

In one embodiment, the above phrase of "a length of a time interval between a start time of the first slot and an end time for receiving the first signaling being not less than an earliest slot of the first reference delay" includes the following meaning: in a carrier to which the first time-frequency resource set belongs in frequency domain, there does not exist a length of a time interval between a start time of a slot earlier than the first slot and an end time for receiving the first signaling being not less than the first reference delay.

Embodiment 13

Embodiment 13 illustrates a schematic diagram of a second slot according to one embodiment of the present disclosure, as shown in FIG. 13. In FIG. 13, in each situation, each rectangle in the top row represents a slot in downlink, each rectangle in the middle row represents a slot in uplink, and each rectangle in the bottom row represents a slot in sidelink; in case A, a reference time is an end time for receiving a first signaling; in case B, a reference time is an end time for transmitting a first signal; and in case C, a reference time is an end time for receiving a third signaling.

In embodiment 13, the first signaling in the present disclosure is used to determine a second delay, a start time of the reference time-frequency resource set in the present disclosure in time domain is equal to a start time of a second slot, and a start time of the second slot in the present disclosure in not earlier than a reference time; for an SCS of a subcarrier comprised in the second time-frequency resource set in the present disclosure in frequency domain, the second slot is an earliest slot satisfying a length of a time interval between its start time and the reference time is not less than the second delay; the reference time is one of an end time for receiving the first signaling, an end time for transmitting the first signal in the present disclosure or an end time for receiving the third signaling in the present disclosure.

In one embodiment, the above phrase of "the first signaling being used to a second delay" includes the following meaning: the first signaling is used by the first node in the present disclosure to determine the second delay.

In one embodiment, the above phrase of "the first signaling being used to a second delay" includes the following meaning: the first signaling is used to directly indicate the second delay.

In one embodiment, the above phrase of "the first signaling being used to a second delay" includes the following meaning: the first signaling is used to indirectly indicate the second delay.

In one embodiment, the above phrase of "the first signaling being used to a second delay" includes the following meaning: the first signaling is used to explicitly indicate the second delay.

In one embodiment, the above phrase of "the first signaling being used to a second delay" includes the following meaning: the first signaling is used to implicitly indicate the second delay.

In one embodiment, the second delay is equal to a time length of a non-negative integer number of slot(s).

In one embodiment, the second delay is equal to a time length of a positive integer number of slot(s).

In one embodiment, the second delay is greater than 0.

In one embodiment, the second delay is equal to a time length of a non-negative integer number of sidelink slot(s).

In one embodiment, the second delay is equal to a time length of a positive integer number of sidelink slot(s).

In one embodiment, the second delay is equal to a time length of a non-negative integer number of downlink slot(s).

In one embodiment, the second delay is equal to a time length of a positive integer number of downlink slot(s).

In one embodiment, the second delay is equal to a time length of a non-negative integer number of uplink slot(s).

In one embodiment, the second delay is equal to a time length of a positive integer number of uplink slot(s).

In one embodiment, for an SCS of a subcarrier comprised in the second time-frequency resource set in frequency domain, the second delay is equal to a time length of a non-negative integral number of slot(s).

In one embodiment, for an SCS of a subcarrier comprised in the second time-frequency resource set in frequency domain, the second delay is equal to a time length of a positive integer number of slot(s).

In one embodiment, for an SCS of a subcarrier comprised in the first time-frequency resource set in frequency domain, the second delay is equal to a time length of a non-negative integer number of slot(s).

In one embodiment, for an SCS of a subcarrier comprised in the first time-frequency resource set in frequency domain, the second delay is equal to a time length of a positive integer number of slot(s).

In one embodiment, the second delay is equal to a time length of a positive integer number of OFDM symbol(s).

In one embodiment, the second delay is equal to a time length of at least one Tc, where Tc=1/(480000*4096) s.

In one embodiment, the second delay is equal to a positive integer number of slot(s) of a numerology adopted by the first signal.

In one embodiment, a start time of the reference time-frequency resource set in time domain refers to a start time of time-domain resources comprised in the reference time-frequency resource set.

In one embodiment, a start time of the reference time-frequency resource set in time domain refers to a start time of an earliest time-domain resource comprised in the reference time-frequency resource set.

In one embodiment, a start time of the reference time-frequency resource set in time domain refers to a start time of an earliest OFDM symbol comprised in the reference time-frequency resource set.

In one embodiment, the second slot is an uplink slot.

In one embodiment, the second slot is a slot corresponding to an SCS of a subcarrier comprised in the second time-frequency resource set in frequency domain.

In one embodiment, time lengths of the second slot and the first slot in the present disclosure are not equal.

In one embodiment, time lengths of the second slot and the first slot in the present disclosure are equal.

In one embodiment, a start time of the second slot is later than the reference time.

In one embodiment, a start time of the second slot is equal to the reference time.

In one embodiment, the above phrase of "the second slot being an earliest slot whose length of time interval between a start time and the reference time being not less than the second delay" includes the following meaning: in a carrier to which the second time-frequency resource set belongs in frequency domain, the second slot belongs to a second slot set, the second slot set comprises at least one slot, a length of a time interval between a start time of any slot in the second slot set and the reference time is not less than the second delay, and the second slot is a slot with an earliest start time in the second slot set.

In one embodiment, the above phrase of "the second slot being an earliest slot whose length of time interval between a start time and the reference time being not less than the second delay" includes the following meaning: in a carrier to which the second time-frequency resource set belongs in frequency domain, there does not exist a length of a time interval between a start time of a slot earlier than the second slot and the reference time being not less than the second delay.

In one embodiment, the above phrase of "the reference time being one of an end time for receiving the first signaling, an end time for transmitting the first signal or an end time for receiving the third signaling" includes the following meaning: the reference time is an end time for receiving the first signaling.

In one embodiment, the above phrase of "the reference time being one of an end time for receiving the first signaling, an end time for transmitting the first signal or an end time for receiving the third signaling" includes the following meaning: the reference time is an end time for transmitting the first signal.

In one embodiment, the above phrase of "the reference time being one of an end time for receiving the first signaling, an end time for transmitting the first signal or an end time for receiving the third signaling" includes the following meaning: the reference time is an end time for receiving the third signaling.

In one embodiment, an end time for transmitting the first signal is an end time of time-domain resources comprised in the first time-frequency resource set.

In one embodiment, an end time for transmitting the first signal is an end time of a latest OFDM symbol comprised in the first time-frequency resource set.

In one embodiment, an end time for transmitting the first signal is an end time of a slot to which time-domain resources occupied by the first signal belong.

In one embodiment, an end time for transmitting the first signal is an end time of a latest OFDM symbol among OFDM symbols occupied by the first signal in time domain.

In one embodiment, an end time for transmitting the first signal is an end time of a slot to which a latest OFDM symbol among OFDM symbols occupied by the first signal belongs in time domain.

In one embodiment, an end time for receiving the third signaling is an end time for receiving a slot to which time-domain resources occupied by the third signaling belong.

In one embodiment, an end time for receiving the third signaling is an end time for receiving a latest OFDM symbol among OFDM symbols occupied by the third signaling belongs in time domain.

In one embodiment, an end time for receiving the third signaling is an end time for receiving a slot to which a latest OFDM symbol among OFDM symbols occupied by the third signaling belongs in time domain.

Embodiment 14

Figure 14:
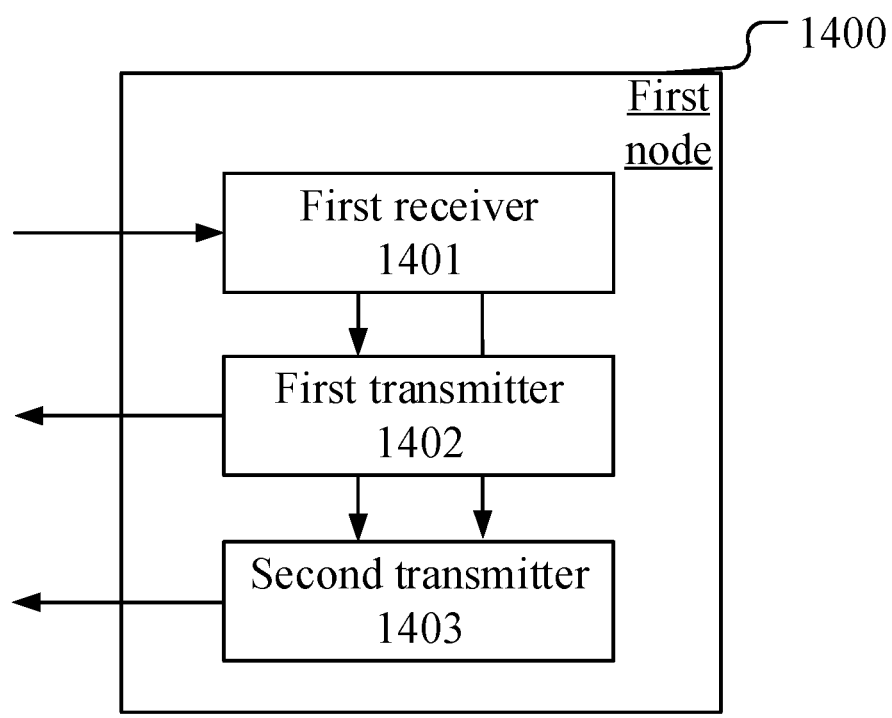
FIG. 14 illustrates a structure block diagram of a processing device in a first node according to one embodiment of the present disclosure.

Embodiment 14 illustrates a structure block diagram of a processing device in a first node according to one embodiment of the present disclosure, as shown in FIG. 14. In FIG. 14, a processing device 1400 of a first node comprises a first receiver 1401, a first transmitter 1402 and a second transmitter 1403. The first receiver 1401 comprises the transmitter/receiver 456 (including the antenna 460), the receiving processor 452 and the controller/processor 490 in FIG. 4 of the present disclosure; or the first receiver 1401 comprises the transmitter/receiver 556 (including the antenna 560), the receiving processor 552 and the controller/processor 590 in FIG. 5 of the present disclosure; the first transmitter 1402 comprises the transmitter/receiver 456 (including the antenna 460), the transmitting processor 455 and the controller/processor 490 in FIG. 4 of the present disclosure; or the first transmitter 1402 comprises the transmitter/receiver 556 (including the antenna 560), the transmitting processor 555 and the controller/processor 590 in FIG. 5 of the present disclosure; the second transmitter 1403 comprises the transmitter/receiver 456 (including the antenna 460), the transmitting processor 455 and the controller/processor 490 in FIG. 4 of the present disclosure; or the second transmitter 1403 comprises the transmitter/receiver 556 (including the antenna 560), the transmitting processor 555 and the controller/processor 590 in FIG. 5 of the present disclosure;

In embodiment 14, the first receiver 1401 receives a first signaling; the first transmitter 1402 transmits a first signal in a first time-frequency resource set; and the second transmitter 1403 transmits a second signal in a second time-frequency resource set; herein, the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths.

In one embodiment, the first transmitter 1402 transmits a second signaling and the first receiver 1401 receives a third signaling; herein, the second signaling is used to indicate at least one of time-frequency resources occupied by the first signal, or an MCS adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling.

In one embodiment, a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain are used together to determine the X candidate time lengths.

In one embodiment, a time length of a time interval between an end time for receiving the first signaling and a start time of the first time-frequency resource set in time domain is used to determine a second time length, a time length of a slot in slots to which time-domain resources comprised in the first time-frequency resource set belong is equal to a third time length, a magnitude relation between a difference value of the third time length and the second time length and the first TA quantity is used to determine the first time length out of the X candidate time lengths.

In one embodiment, the first receiver 1401 receives first information; herein, the first information is used to determine the first TA quantity, and the first information is transmitted via an air interface.

In one embodiment, the first signaling is used to determine a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

In one embodiment, the first transmitter 1402 transmits a second signaling and the first receiver 1401 receives a third signaling; herein, the second signaling is used to indicate at least one of time-frequency resources occupied by the first signal, or an MCS adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling; the first signaling is used to determine a second delay, a start time of the reference time-frequency resource set in time domain is equal to a start time of a second slot, and a start time of the second time slot is not earlier than a reference time; for an SCS of a subcarrier comprised in the second time-frequency resource set in frequency domain, the second slot is an earliest slot satisfying a length of a time interval between its start time and the reference time is not less than the second delay; the reference time is one of an end time for receiving the first signaling, an end time for transmitting the first signal or an end time for receiving the third signaling.

Embodiment 15

Figure 15:
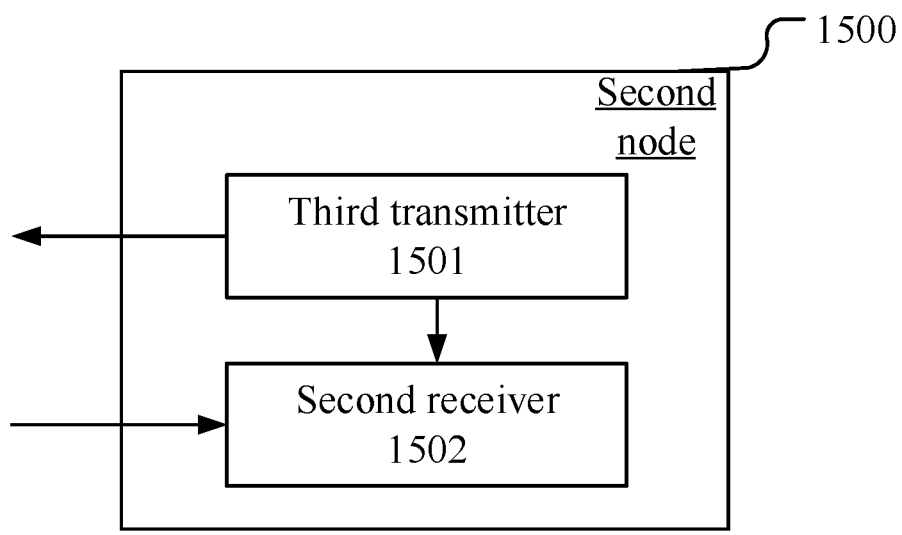
FIG. 15 illustrates a structure block diagram of a processing device in second node according to one embodiment of the present disclosure.

Embodiment 15 illustrates a structure block diagram of a processing device in a second node according to one embodiment of the present disclosure, as shown in FIG. 15. In FIG. 15, a processing device 1500 in the second node comprises a third transmitter 1501 and a second receiver 1502. The third transmitter 1501 comprises the transmitter/receiver 416 (including the antenna 460), the transmitting processor 415 and the controller/processor 440 in FIG. 4 of the present disclosure; the second receiver 1502 comprises the transmitter/receiver 416 (including the antenna 420), the receiving processor 412 and the controller/processor 440 in FIG. 4 of the present disclosure.

In embodiment 15, the third transmitter 1501 transmits a first signaling; the second receiver 1502 receives a second radio signal in a second time-frequency resource set; herein, the first signaling is used to determine the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1.

In one embodiment, an SCS of a subcarrier comprised in the first time-frequency resource set in frequency domain, and an SCS of a subcarrier comprised in the second time-frequency resource set in frequency domain are used together to determine the X candidate time lengths.

In one embodiment, the third transmitter 1501 transmits first information; herein, the first information is used to determine the first TA quantity, and the first information is transmitted via an air interface.

In one embodiment, the first signaling is used to indicate a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The base station or network side equipment in the present disclosure includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling;
a first transmitter, transmitting a first signal in a first time-frequency resource set; and
a second transmitter, transmitting a second signal in a second time-frequency resource set;
wherein the first signaling is used to determine the first time-frequency resource set, and the first signaling is used to determine a reference time-frequency resource set; a first Timing Advance (TA) quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths; the second signal carries a HARQ feedback of sidelink, and the second signal is transmitted through a PUCCH or a PUSCH;
the first transmitter transmits a second signaling, and the first receiver receives a third signaling; wherein the second signaling is used to indicate at least one of time-frequency resources occupied by the first signal, or a Modulation and Coding Scheme (MCS) adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling; the third signaling is transmitted through a Physical Sidelink Feedback Channel (PSFCH).

2. The first node according to claim 1, wherein a time length of a time interval between an end time for receiving the first signaling and a start time for transmitting the first signal, a Subcarrier Spacing (SCS) of a subcarrier comprised in the first time-frequency resource set in frequency domain and an SCS of a subcarrier comprised in the second time-frequency resource set in frequency domain are used together to determine the X candidate time lengths.

3. The first node according to claim 1, wherein a time length of a time interval between an end time for receiving the first signaling and a start time of the first time-frequency resource set in time domain is used to determine a second time length, a time length of a slot among slot(s) to which time-domain resources comprised in the first time-frequency resource set belong is equal to a third time length, a magnitude relation between a difference value of the third time length and the second time length and the first TA quantity is used to determine the first time length out of the X candidate time lengths.

4. The first node according to claim 1, wherein the first receiver receives first information; wherein the first information is used to determine the first TA quantity, and the first information is transmitted via an air interface.

5. The first node according to claim 1, wherein the first signaling is used to determine a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

6. The first node according to claim 1, wherein the first signaling is used to determine a second delay, a start time of the reference time-frequency resource set in time domain is equal to a start time of a second slot, and a start time of the second time slot is not earlier than a reference time; for an SCS of a subcarrier comprised in the second time-frequency resource set in frequency domain, the second slot is an earliest slot satisfying a length of a time interval between its start time and the reference time is not less than the second delay; the reference time is an end time for receiving the third signaling.

7. A second node for wireless communications, comprising:
a third transmitter, transmitting a first signaling; and a second receiver, receiving a second radio signal in a second time-frequency resource set;

wherein the first signaling is used to determine the first time-frequency resource set, and the first signaling is used to indicate a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the second signal carries a HARQ feedback of sidelink, and the second signal is transmitted through a PUCCH or a PUSCH;

the first signaling carries a DCI, and the first signaling is used to configure a sidelink transmission; the first signaling is used to determine a second delay, a start time of the reference time-frequency resource set in time domain is equal to a start time of a second slot, and a start time of the second time slot is not earlier than a reference time; for an SCS of a subcarrier comprised in the second time-frequency resource set in frequency domain, the second slot is an earliest slot satisfying a length of a time interval between its start time and the reference time is not less than the second delay; the reference time is an end time for receiving a third signaling, and the third signaling is transmitted through a Physical Sidelink Feedback Channel (PSFCH).

8. The second node according to claim 7, wherein an SCS of a subcarrier comprised in the first time-frequency resource set in frequency domain and an SCS of a subcarrier comprised in the second time-frequency resource set in frequency domain are used together to determine the X candidate time lengths.

9. The second node according to claim 7, wherein the third transmitter transmits first information; wherein the first information is used to determine the first TA quantity, and the first information is transmitted via an air interface.

10. The second node according to claim 7, wherein the first signaling is used to indicate a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

11. The second node according to claim 7, wherein for an SCS of a subcarrier adopted by the second signal, any of the X candidate time lengths is equal to a time length of a non-negative integral multiple of a slot; there exists one of the X candidate time lengths being equal to 0.

12. A method in a first node for wireless communications, comprising:
receiving a first signaling;
transmitting a second signaling;
transmitting a first signal in a first time-frequency resource set;
receiving a third signaling; and transmitting a second signal in a second time-frequency resource set;

wherein the first signaling is used to determine the first time-frequency resource set, and the first signaling is used to determine a reference time-frequency resource set; a first TA quantity is used to determine a TA quantity of an uplink timing relative to a downlink timing; a time length of a time interval between a start time of the second time-frequency resource set in time domain and a start time of the reference time-frequency resource set in time domain is equal to a first time length, the first time length is equal to one of X candidate time lengths, there exists one of the X candidate time lengths being greater than the first TA quantity, X being a positive integer greater than 1; the first TA quantity is used to determine the first time length out of the X candidate time lengths; the second signal carries a HARQ feedback of sidelink, and the second signal is transmitted through a PUCCH or a PUSCH;

the second signaling is used to indicate at least one of time-frequency resources occupied by the first signal, or an MCS adopted by the first signal; the third signaling is used to determine whether the first signal is correctly received; a transmitter of the third signaling is different from a transmitter of the first signaling; at least one of time-frequency resources occupied by the second signaling or time-frequency resources occupied by the first signal is used to determine radio resources occupied by the third signaling; the third signaling is transmitted through a PSFCH.

13. The method in a first node according to claim 12, wherein a time length of a time interval between an end time for receiving the first signaling and a start time for transmitting the first signal, an SCS of a subcarrier comprised in the first time-frequency resource set in frequency domain and an SCS of a subcarrier comprised in the second time-frequency resource set in frequency domain are used together to determine the X candidate time lengths.

14. The method in a first node according to claim 12, wherein a time length of a time interval between an end time for receiving the first signaling and a start time of the first time-frequency resource set in time domain is used to determine a second time length, a time length of a slot among slot(s) to which time-domain resources comprised in the first time-frequency resource set belong is equal to a third time length, a magnitude relation between a difference value of the third time length and the second time length and the first TA quantity is used to determine the first time length out of the X candidate time lengths.

15. The method in a first node according to claim 12, comprising:
receiving first information;
wherein the first information is used to determine the first TA quantity, and the first information is transmitted via an air interface.

16. The method in a first node according to claim 12, wherein the first signaling is used to determine a first delay, and the first TA quantity and the first delay are used together to determine a first reference delay; a start time of the first time-frequency resource set in time domain is equal to a start time of a first slot, and a start time of the first slot is not earlier than an end time for receiving the first signaling; for an SCS of a subcarrier comprised in the first time-frequency resource set in frequency domain, the first slot is an earliest slot satisfying a length of a time interval between its start time and an end time for receiving the first signaling is not less than the first reference delay.

17. The method in a first node according to claim 12, wherein the first signaling is used to determine a second delay, a start time of the reference time-frequency resource set in time domain is equal to a start time of a second slot, and a start time of the second time slot is not earlier than a reference time; for an SCS of a subcarrier comprised in the second time-frequency resource set in frequency domain, the second slot is an earliest slot satisfying a length of a time interval between its start time and the reference time is not less than the second delay; the reference time is an end time for receiving the third signaling.

* * * * *